United States Patent
Gaillard et al.

(10) Patent No.: US 6,457,074 B1
(45) Date of Patent: Sep. 24, 2002

(54) DIRECT MEMORY ACCESS DATA TRANSFERS

(75) Inventors: Regis Gaillard, La Gaude (FR); Nicolas Chauve, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/366,666

(22) Filed: Aug. 3, 1999

(30) Foreign Application Priority Data

Aug. 3, 1998 (EP) .............................. 98401984

(51) Int. Cl.[7] .............................................. G06F 13/28
(52) U.S. Cl. ............................ 710/25; 710/59; 710/60; 710/107; 711/165; 713/600
(58) Field of Search ........................... 710/22, 59, 25, 710/60, 107, 110; 711/165; 713/600; 365/193

(56) References Cited

U.S. PATENT DOCUMENTS

| | | | | |
|---|---|---|---|---|
| 5,097,437 A | * | 3/1992 | Larson ........................ | 395/775 |
| 5,388,250 A | * | 2/1995 | Lewis et al. ................. | 395/550 |
| 5,425,135 A | | 6/1995 | Motoyama et al. ......... | 358/1.15 |
| 5,440,751 A | * | 8/1995 | Santeler et al. ............. | 395/800 |
| 5,778,253 A | | 7/1998 | Blair et al. .................... | 710/68 |
| 6,125,425 A | * | 9/2000 | Cole et al. .................. | 711/106 |

FOREIGN PATENT DOCUMENTS

WO    WO 93/23812    11/1993

* cited by examiner

*Primary Examiner*—Matthew Kim
*Assistant Examiner*—Pierre M. Vital
(74) *Attorney, Agent, or Firm*—Gerald E. Laws; W. James Brady, III; Frederick J. Telecky, Jr.

(57) ABSTRACT

A digital system has a host processor 200 with a bus controller 210 and peripherals 220(0)–220(31) interconnected by an interconnect bus 230. 32 peripherals are share a common strobe line (nSTROBE [0]) on an embodiment of the interconnect bus in a first subdomain. Additional subdomains, such as sub-domain 260, can be likewise connected to interconnect bus 230. Additional strobe lines nSTROBE(n) are used to select a particular sub-domain in response to an address presented to bus controller 210 by CPU 200. A FIFO is provided on a peripheral device to reduce data transfer access time. When the FIFO is almost empty, a FIFO management state machine requests a DMA transfer by asserting the nDMA_REQ signal on the interconnect bus, thus transitioning from idle state 2300 to transfer state 2310 along arc 2301. The DMA controller transfers several data words until the FIFO becomes full, as indicated by word_cpt=FIFO_size. Then the FIFO state machine controller transitions to end transfer state 2320 and asserts the END_DMA signal to stop the DMA transfer and then transitions to IDLE state 2300.

13 Claims, 17 Drawing Sheets

NOTES:
→ SIGNAL SUPPLIED BY BUS CONTROLLER BRIDGE
← SIGNAL SUPPLIED BY PERIPHERAL UNIT

⟅ INDICATES THAT CS, A, RHEAMAS, AND RnW REMAIN VALID UNTIL nSTROBE TRANSITIONS TO THE HIGH STATE

▨ LOGIC STATE UNKNOWN. SIGNALS MAY BE EITHER A LOGIC ONE OR A LOGIC ZERO AND BUSES MAY OR MAY NOT BE ACTIVE.

⟩— ACTIVE TO TRI-STATE TRANSITION

—⟨ TRI-STATE TO ACTIVE TRANSITION

PERIPHERAL CAN PLACE DATA
THE DI BUS DURING THIS TIME
THE ONLY REQUIREMENT IS THAT
SETUP TIME OF THE BUS BE MET

DIRECT MEMORY ACCESS DATA TRANSFERS

This application claims priority to Ser. No. 98401984.4, filed in Europe on Aug. 3, 1998 (TI-27909EU).

CROSS REFERENCE TO RELATED APPLICATIONS

This application is related to co-assigned application Ser. No. 09/365,995, filed contemporaneously herewith and incorporated herein by reference.

TECHNICAL FIELD OF THE INVENTION

The present invention relates generally to the field of host processor to peripheral interfacing, and more particularly to a bus interface circuit for use in conjunction with a peripheral device having a clock that is not synchronized with the host processor clock.

BACKGROUND OF THE INVENTION

Digital system applications that require a host processor to be interfaced with peripheral processing devices are prevalent. In such applications, the peripheral device is typically programmed to carry out input/output operations and/or data processing separately from the host processor. Consequently, such a peripheral device may contain its own processor, input/output circuitry, clock and control circuitry, and different addressable memory locations.

In such applications it is not always desirable to synchronize the peripheral clock with the clock in the host processor, so the peripheral clock can run at any speed relative to the host processor clock (either faster or slower). As a result of the difference between the peripheral and host microprocessor clocks, as well as the architecture and particular type of memory units employed in the peripheral device, the access time for different addressable memory locations within the peripheral can vary.

For a host processor to access (i.e., write data to and read data from) memory locations within the above described general peripheral processing device, an interfacing circuit is required for coupling the host processor and peripheral address and data buses, and to provide the appropriate timing for data transfers.

Consequently, there exists a need for a generic bus interface circuit for interfacing a host processor with a processing peripheral device, where the host processor and peripheral can have different asynchronous clocks, and peripheral memory locations accessible to the processor can have different access times.

As digital systems evolve to the point where the host processor, memory and several peripheral subsystems are all co-located on the same semiconductor substrate, it is important to minimize power dissipation and to conserve gate count within the interconnect structure. Furthermore, it is desirable to have circuit modules, (referred to as core circuits, or cells) that can be designed once and the designs reused and interconnected in a number of different digital systems in different combinations.

SUMMARY OF THE INVENTION

An illustrative embodiment of the present invention seeks to provide a bus for interconnecting common peripherals operating asynchronously to a host processor in a gate-efficient, low power implementation that can support zero wait state bus transactions and that avoids or minimizes above-mentioned problems.

Aspects of the invention are specified in the claims. In carrying out principles of the present invention a method for transferring a plurality of data on a data bus connected between a first device operating in accordance with a first clock signal and a second device operating in accordance with a second clock signal, comprises the steps of: initiating a transfer of a plurality of data in response to asserting a request signal by the second device; starting a first data transfer between the first device and the second device by the first device asserting a strobe signal on the data bus, the strobe signal having at least a first pulse, wherein the strobe signal is synchronized to the first clock signal; completing the first data transfer by the second device asserting a ready signal on the data bus synchronized with the strobe signal; and repeating the steps of starting a data transfer and completing a data transfer until the second device asserts an end signal to terminate the transfer of the plurality of data.

According to another feature of the invention, a digital system having data bus for transferring a plurality of data connected between a first device operating in accordance with a first clock signal and a second device operating in accordance with a second clock signal, comprises: control circuitry in the second device having a first output connected to the bus for initiating a transfer of a plurality of data in response to asserting a request signal and a second output connected to the bus for asserting an end signal to terminate the transfer of the plurality of data; strobe circuitry on the first device connected to the data bus and to the first clock signal, operable to start a first data transfer between the first device and the second device in response to the request signal by asserting a strobe signal on the data bus, the strobe signal having at least a first pulse, wherein the strobe signal is synchronized to the first clock signal; and ready circuitry on the second device connected to the data bus for completing the first data transfer by asserting a ready signal on the data bus synchronized with the strobe signal.

According to another feature of the invention, a FIFO type buffer is included on the second device connected to the data buss; and the control circuit on the second device is operable to assert the end signal in response to the FIFO type buffer becoming approximately full or approximately empty.

These and other features of the invention that will be apparent to those skilled in the art from the following detailed description of the invention, taken together with the accompanying drawings.

BRIEF DESCRIPTION OF THE DRAWINGS

For a better understanding of the present invention, reference will now be made, by way of example, to the accompanying drawings, in which:

FIGS. 25A and 25B together are a block diagram of a complex digital system on a single semiconductor substrate having two host processors and two interconnect busses, according to aspects of the present invention FIGS. 25A and 25B are related.

Corresponding numerals and symbols in the different figures and tables refer to corresponding parts unless otherwise indicated.

DETAILED DESCRIPTION OF THE INVENTION

Aspects of the present invention include methods and apparatus for interconnecting a host processor with one or more peripheral devices. In the following description, specific information is set forth to provide a thorough understanding of the present invention. Well known circuits and devices are included in block diagram form in order not to complicate the description unnecessarily. For example, general interrupt operation and variable sized buses are known from examples such as Futurebus (ANSI/IEEE 896.1-1987) and the VMEbus (IEEE 1014). Moreover, it will be apparent to one skilled in the art that specific details of these blocks are not required in order to practice the present invention.

The drive by integrated circuit designers to place more and more functionality into single chip solutions in shorter and shorter development cycles has created a need that designs for core devices be transportable from product to product and across generations of products. Inherent in achieving such reusability of product is an interconnect paradigm that is not processor-dependent, is highly flexible, and can be tailored to meet differing requirements of different peripheral and user-specific logic blocks. An interconnect bus according to aspects of the present invention is such a paradigm.

Figure 1:
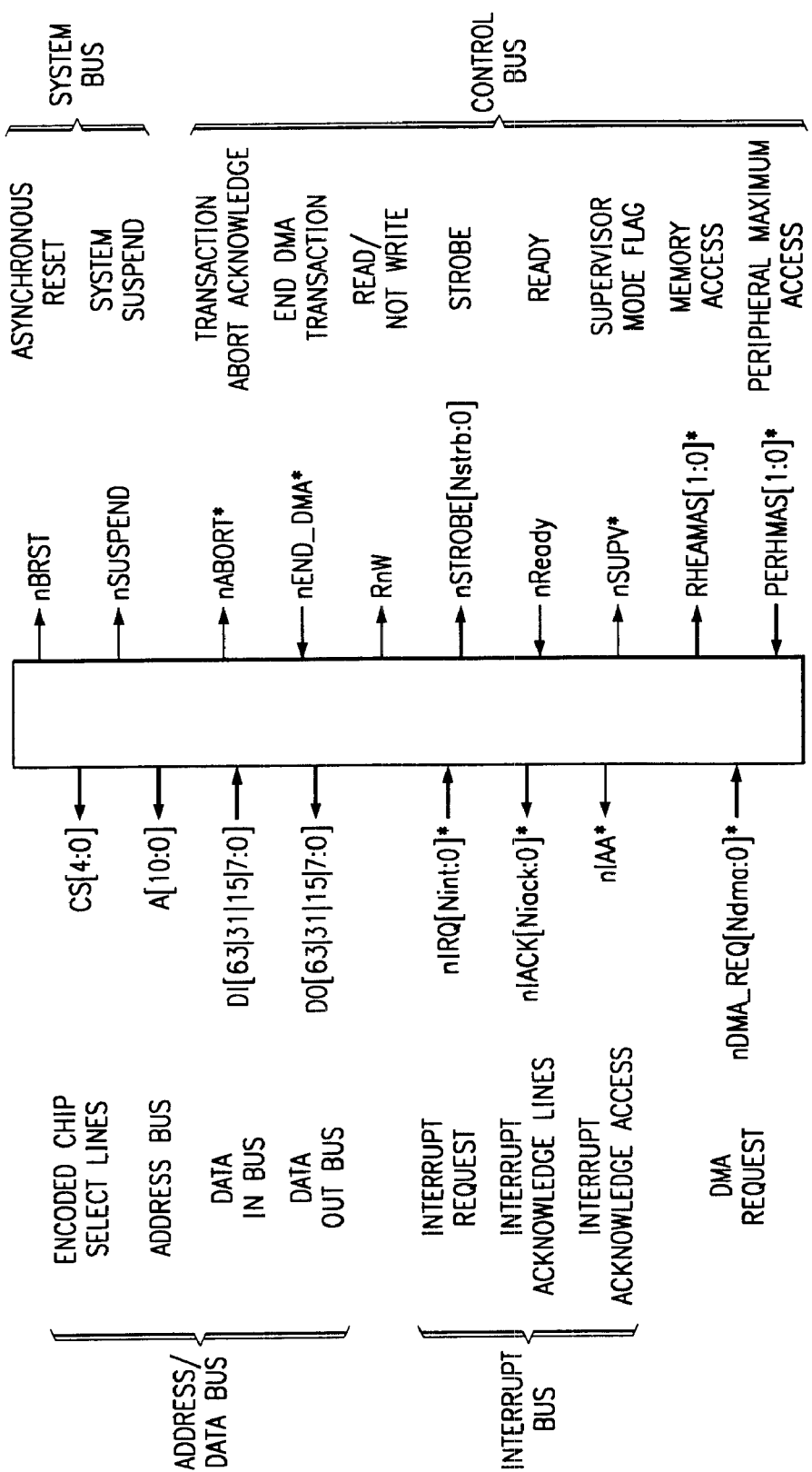
FIG. 1 is a schematic representation of various signal lines which comprise an embodiment of an interconnect bus according to aspects of the present invention.

FIG. 1 is a schematic representation of various signal lines which comprise an embodiment of an interconnect bus according to aspects of the present invention. The bus can be viewed as consisting of five functional signal groups: (1) address/data lines, (2) interrupt request lines, (3) DMA request lines, (4) system signal lines, and (5) bus control lines.

As indicated in FIG. 1, many of the signals are optional. The distinction between basic signals and optional signals is as follows.

Basic signals: These signals define a first embodiment of a bus according to aspects of the present invention.

Optional signals: These signals are not required in each embodiment of the bus, but various signals can be included in an alternative embodiment to access special features of the bus, such as DMA transactions or interrupt lines.

Several bus parameters are given variable assignments as they are implementation dependent. When these parameters are assigned values, a particular embodiment of the bus is created. These parameters are:

Nstrb: nSTROBE[0] through nSTROBE[Nstrb] gives a total count of Nstrb+1 strobe lines. A 64K memory page is associated with each strobe line.

Nint: nIRQ[0] through nIRQ[Nint] gives a total count of Nint+1 interrupt request lines.

Niack: IACK[0] through IACK[Niack] gives a total count of Niack+1 interrupt acknowledge lines.

Ndma: nDMA_REQ[0] through nDMA_REQ[Ndma] gives a total count of Ndma+1 DMA channels.

Nck: FCLK[0] through FCLK[Nck] gives a total count of Nck+1 fixed frequency clocks.

The basic signals are described in Table 1 and should be present in each bus controller embodiment.

TABLE 1

Basic Interconnect Bus Signals

| Name | I/O | Signal description |
|---|---|---|
| A(10:0) | Out | Address bus |
| | | 2K address reach per CS(4:0) chip select assignment. |
| CS(4:0) | Out | Encoded chip selects |
| | | Allows access to a maximum of 32 peripherals, each with 2K address reach. |
| | | If a peripheral requires more than a 2K block of address space, it can be mapped onto two or more encoded chip selects. |
| DO(7.0) minimum configuration | Out | Data Out bus |
| | | Services data transactions from the bus controller bridge to the peripheral. |
| DO(63\|31\|15:0) optional | | Data can be received by the peripheral on the rising edge of nSTROBE. |
| DI(7:0) minimum configuration | In | Data In bus |
| | | Services data transactions from the peripheral to the bus controller bridge. |
| DI(63\|31\|15:0) optional | | The bus controller bridge will read the DI bus on the rising edge of nSTROBE when nREADY is active low. |

TABLE 1-continued

Basic Interconnect Bus Signals

| Name | I/O | Signal description |
|---|---|---|
| | | The peripheral is not allowed to drive the DI bus until after the falling edge of nSTROBE. |
| RnW | Out | Read not Write<br>1 => read - 0 => write.<br>This signal is valid at the same time the address bus is valid. |
| nREADY | In | Ready (Active low)<br>A peripheral sets this signal low when it is ready to send or receive data.<br>The state of nREADY is received by the bus controller bridge on the rising edge of nSTROBE. If the peripheral or user-specific logic unit keeps nREADY high prior to the rising edge of nSTROBE, an extra wait state will be inserted in the current transaction. \ |
| nBRST | Out | Asynchronous reset (Active low) |
| nSTROBE[0]<br>Minimum<br>Configuration<br><br>nSTROBE[N:1]<br>Optional | Out | Synchronous strobe transaction clock.<br>Used to enable synchronous bus transactions. These clocks are only active when data is being transferred.<br>All transactions complete on the rising edge of nSTROBE when nREADY is active (low).<br>The bus controller starts and finishes all transfers with nSTROBE at a high level.<br>In case of transactions extended by the use of nREADY, one additional nSTROBE pulse is generated per wait state request by the peripheral.<br>The nSTROBE clock period can be divided down, under software control, to accommodate peripherals that do not have a fast enough response time to support a short nSTROBE cycle. Registers are provided in the bus controller bridge to facilitate this programmable option. The extension of the cycle will be transparent to the peripheral. |
| PERHMAS[1:0] | In | Peripheral word access size.<br>0 => 8 bits, 1 => 16 bits, 2 => 32 bits, 3 => 64 bits<br>This field is used by the bus controller bridge to determine the word size of the peripheral. Some peripherals can be configured to service multiple word sizes, and in this case this field represents the current word size assigned to the peripheral.<br>The bus controller bridge will read this field on the rising edge of nSTROBE when nREADY is active low. |

The optional signals are described in Table 2. Optional signals do not need to be included in each embodiment. These optional signals are used to access special features of the bus, such as:

Interrupt capability

Interrupt line sharing

DMA channels

Breakpoint support for debugging

Supervisor mode

TABLE 2

Optional Interconnect Bus Signals

| Name | I/O | Description |
|---|---|---|
| RHEAMAS(1:0) | Out | bus word access size.<br>0 => 8 bits, 1 => 16 bits, 2 => 32 bits, 3 => 64 bits<br>RHEAMAS is guaranteed to be valid at the falling edge of nSTROBE.<br>This field is used when the bus supports multiple word size transactions. |
| nIRQ(Nint:0) | In | Interrupt request line(s) to bus controller bridge. (Active low)<br>Interrupts can be programmed to be either negative edge sensitive or active low sensitive.<br>Active low interrupts are recommended to minimize the effects of system noise.<br>Active low interrupts can be shared, but the peripheral issuing the interrupt request must maintain the request active until the interrupt is acknowledged by the host.<br>Negative edge activated interrupt sources cannot be shared.<br>The peripheral(s) must provide the logic to 'AND' all interrupt sources to be shared onto a given interrupt line. |
| nDMA_REQ<br>(Ndma:0) | In | DMA request from a peripheral. (Active low) |
| nIAA | Out | Interrupt acknowledge access. (Active low)<br>The nIAA signal is used in a shared interrupt implementation to identify the peripheral issuing the interrupt.<br>When a shared interrupt line is active and recognized, the bus controller bridge issues a nIAA cycle. This cycle is exactly the same as a bus "read" cycle, with the addition that nIAA is active.<br>The peripheral issuing the interrupt responds to the nIAA cycle by outputting a predefined and unique identification code. The code can be a 15 bit code or a 7 bit code. The choice is determined by the value of the LSB. If the value of the LSB = 0, a 7-bit identification is used; otherwise a 15-bit identification is used.<br>The address bus content has no significance during a nIAA transaction. |
| nIACK(Niack:0) | In | Interrupt acknowledge line from bus controller. (Active low)<br>When interrupt lines are shared, each interrupt must be assigned a dedicated nIACK line.<br>nIACK is routed to all peripherals sharing an interrupt line using a daisy-chain interconnect, with the order of interconnect determining the order of priority.<br>nIACK is activated when an active shared interrupt line is serviced by the host. nIACK is propagated through the daisy-chain until it is blocked by the peripheral issuing the interrupt request. If more than one peripheral has issued an interrupt request, that peripheral first in the daisy-chain will be the peripheral serviced. |
| nEND_DMA | In | End DMA transfer. (Active low)<br>Allows a peripheral to end a DMA transaction by activating nEND_DMA on the last DMA cycle.<br>nEND_DMA has the same timing than nREADY. It must be set active low before the rising edge of nSTROBE.<br>All peripherals share the same nEND_DMA line, and must provide the logic to 'AND' all nEND_DMA sources to the nEND_DMA line. |
| nSUSPEND | Out | Suspend (Active low)<br>Indicates that the host processor is in a "freeze" (debug) mode.<br>May be used by a peripheral to suspend internal operations. |
| nABORT | Out | Abort current bus transaction. (Active low)<br>The bus controller bridge limits the time allotted to a bus transaction. If nREADY is not received after a programmable number of host clock cycles, the current transaction is canceled and nABORT is set active low. |

TABLE 2-continued

Optional Interconnect Bus Signals

| Name | I/O | Description |
|---|---|---|
| | | nABORT can also be issued by the bus controller bridge upon detecting other types of malfunctions in a given bus transaction. Peripherals can use nABORT to reset their bus interface logic. |
| nSUPV | Out | Supervisor Mode Flag. (Active low) When active, the host processor is in the operating system's supervisory or protected mode. This flag can be used by peripherals to protect programmable resources from unwanted intrusion by host application programs. |
| nIDLE | Out | Idle Mode (Active low) If the Idle mode for the peripheral is enable (configurable by software), then all peripheral clocks are shut off. The nIDLE signal should be added on a system whose strategy for conserving power is the following one: When entering in an IDLE mode, the clock is shut off inside each peripheral (if allowed) leaving the source clock toggling. This strategy has to be compared with an other option: When entering in an IDLE mode, the clock is shut off directly at its origin for all the peripherals connected on it. |

Additional signals which are specific to a particular peripheral can reside at the peripheral side of the bus. An example of such signals is a daisy-chain implementation of nIACK when interrupt lines are shared. Table 3 describes an IACK daisy-chain.

TABLE 3

IACK daisy-chain

| Name | I/O | Description |
|---|---|---|
| nIACK_IN | In | Daisy-chain input line for interrupt acknowledge. (Active low) When the peripheral is the first link in the chain, nIACK_IN is the same as nIACK. |
| nIACK_OUT | Out | Daisy-chain output line for interrupt acknowledge. (Active low) This signal is used to propagate nIACK to the peripheral next in line in the daisy-chain interconnect. This signal is only used when several interrupt sources share an interrupt line. |

All the signals driven by the peripherals (DI, PERHMAS, nREADY, nEND_DMA) are shared. Various methods can be used to embody signal sharing, such as: using a multiplexer, using tri-state buffers, using open collector buffers, or using other known techniques. In the description of the present embodiment, a tri-state technique is chosen. Table 4 describes an output enable signal that is used by a peripheral to enable its tri-state buffers.

TABLE 4

| Name | I/O | Description |
|---|---|---|
| nOE | Out | Output enable (Active Low) A peripheral sets this signal low when it's selected (i.e. when it's driving the interconnect bus) - This signal is, in fact, the tri-state enable command. This signal is only active during the low part of nSTROBE signal. |

Figure 2:
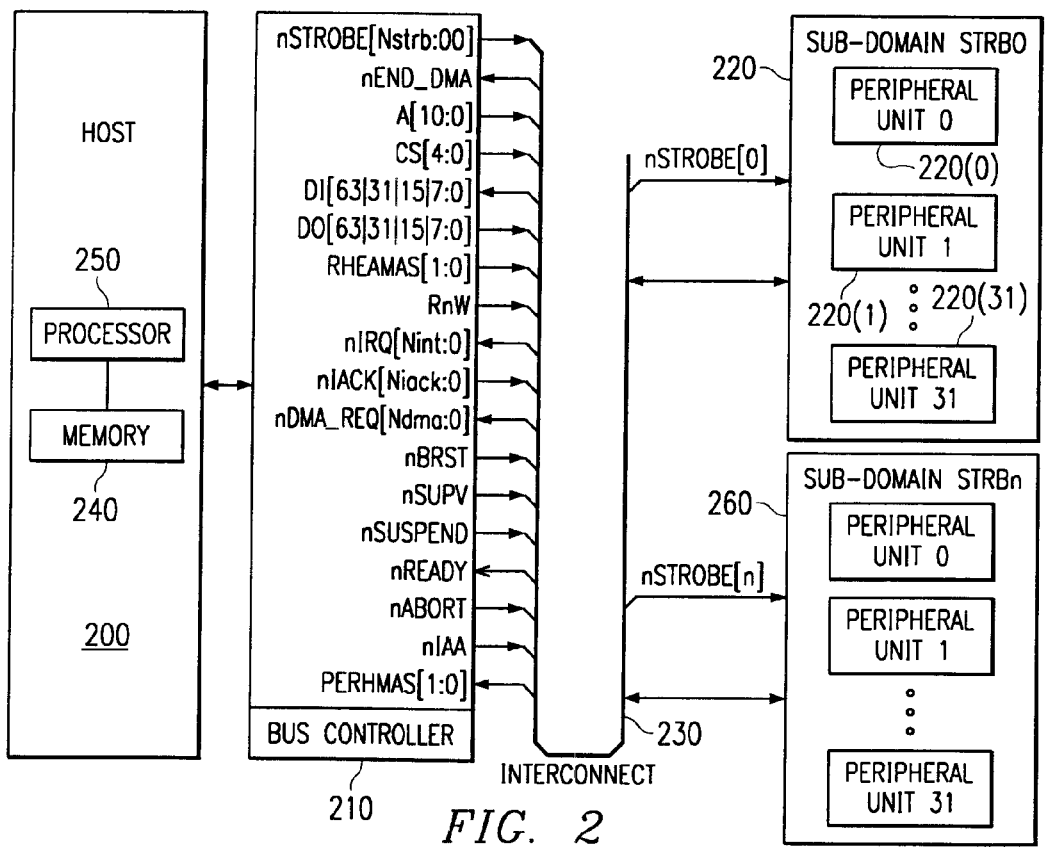
FIG. 2 is block diagram of a system having a host processor and peripherals interconnected by an interconnect bus according to aspects of the present invention.

FIG. 2 is block diagram of a system having a host processor 200 with a bus controller 210 and peripherals 220(0)–220(31) interconnected by an interconnect bus 230 according to aspects of the present invention. 32 peripherals are depicted sharing a common strobe line (nSTROBE[0]) on an embodiment of the interconnect bus, according to aspects of the present invention. The 64K address reach of nSTROBE(0) is referred to as a sub-domain. CS[4:0] segments the 64K strobe address reach into 32 pages, allowing up to 32 peripherals to share a strobe line. Address signals A[10:0] provide an address within a given 2K page. If a peripheral recognizes more than one CS[4:0] value, then it has access to more than one 2K page of address space. The only restriction in assigning address space is that the total address space assigned to a given strobe line cannot exceed 64K.

Each sub-domain then has a mapping granularity which is 2K. Each peripheral assigned to a given sub-domain will be assigned a block of memory-mapped address space that can vary in size from 2K to 64K, depending on how many encoded CS[4:0] values the peripheral decodes.

Alternative embodiments of an interconnect bus according to aspects of the present invention can have different sizes and numbers of bus signals, such as the address bus, for example. Mapping granularity can be larger or smaller. More or less CS signals can be provided, for example.

Additional sub-domains, such as sub-domain 260, can be likewise connected to interconnect bus 230. Additional strobe lines nSTROBE(n) are used to select a particular sub-domain in response to an address presented to bus controller 210 by CPU 200.

Interconnect bus 220 supports zero wait state memory accesses. However, for those peripherals that do not have the response time to support zero wait state accesses, the interconnect bus 220 provides an nREADY signal that allows the peripheral to request that wait states be inserted in the cycle.

In zero wait state accesses, read and write transactions are conducted at the native clock rate of the host, CPU 200, and registration of the data buses, for both read and write transactions, is done on the rising edge of nSTROBE.

Figure 3:
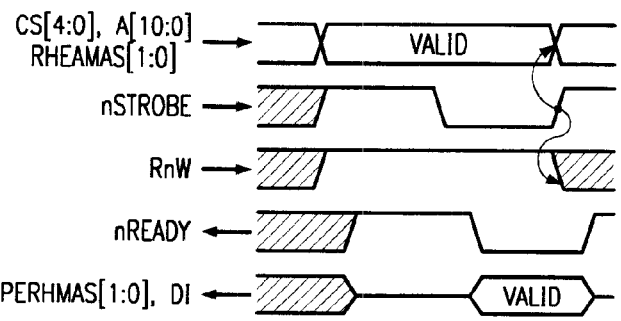
FIG. 3 is a timing diagram of a zero wait state read cycle on the bus of FIG. 2.

FIG. 3 shows the timing for a zero wait state read cycle. Bus controller bridge 210 initiates a bus cycle by placing a peripheral-space address on the address bus (A) and the page address on the chip select bus (CS), setting the RnW line to indicate whether the current transaction is a read or write transaction, and setting RHEAMAS to signify the word size of the transaction in progress. After a specified time has elapsed, bus controller bridge 210 activates nSTROBE.

When nSTROBE transitions to the active low state, if an addressed peripheral 220(n) wishes to complete the transaction, it must set the nREADY line to its active low state. At the same time, if the transaction is a read cycle, the peripheral must place the requested data on the DI bus in time to meet the setup time of the bus controller receiving the data. Data may not be placed on the DI bus prior to the activation of nSTROBE. This prevents the possibility of two consecutive read cycles involving two different peripherals causing a bus clash.

As shown in FIG. 3, address A, chip select CS, RnW, and RHEAMAS remain valid until the end of the transaction (rising edge of nSTROBE). Peripherals, therefore, do not have to register these signals on the falling edge of nSTROBE. On the other hand, nREADY, PERHMAS, and DI are shown to be skewed in time with respect to the signals generated by host controller bridge 210, and indicates the response time of the peripheral unit. These three signals are also required to remain valid until the rising edge of nSTROBE.

Figure 4:
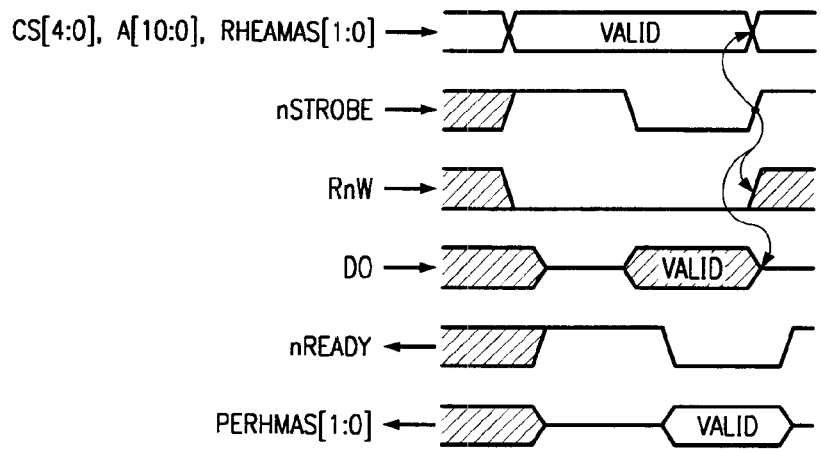
FIG. 4 is a timing diagram of a zero wait state write cycle on the bus of FIG. 2.

FIG. 4 shows the timing for a zero wait state write cycle. This cycle is identical to the read cycle except that bus controller bridge 210 places data on the DO bus before the rising edge of nSTROBE. In fact, the bus controller bridge can issue DO data prior to the activation of nSTROBE. There is no danger of bus clash on this bus since only the bus controller bridge can drive the bus.

As shown in both FIG. 3 and FIG. 4, when nSTROBE transitions to the active low state, if the addressed peripheral wishes to complete the transaction, it must set the nREADY line to its active low state.

Single nSTROBE cycle transactions are not necessarily synonymous with single host clock cycle transactions. An alternative embodiment of bus controller 210 may have the capability of issuing nSTROBE clocks that have been divided down from the host 200's native clock signal. The transaction would appear as a zero wait state access at the peripheral side of interconnect bus 230, but, in fact, would be a multi-cycle transaction at the host 200 side of the bus. The advantage of extending the period of nSTROBE is that it allows a peripheral that has been designed to work in a zero wait state mode to be used in host environments that run at higher native clock speeds.

Figure 5:
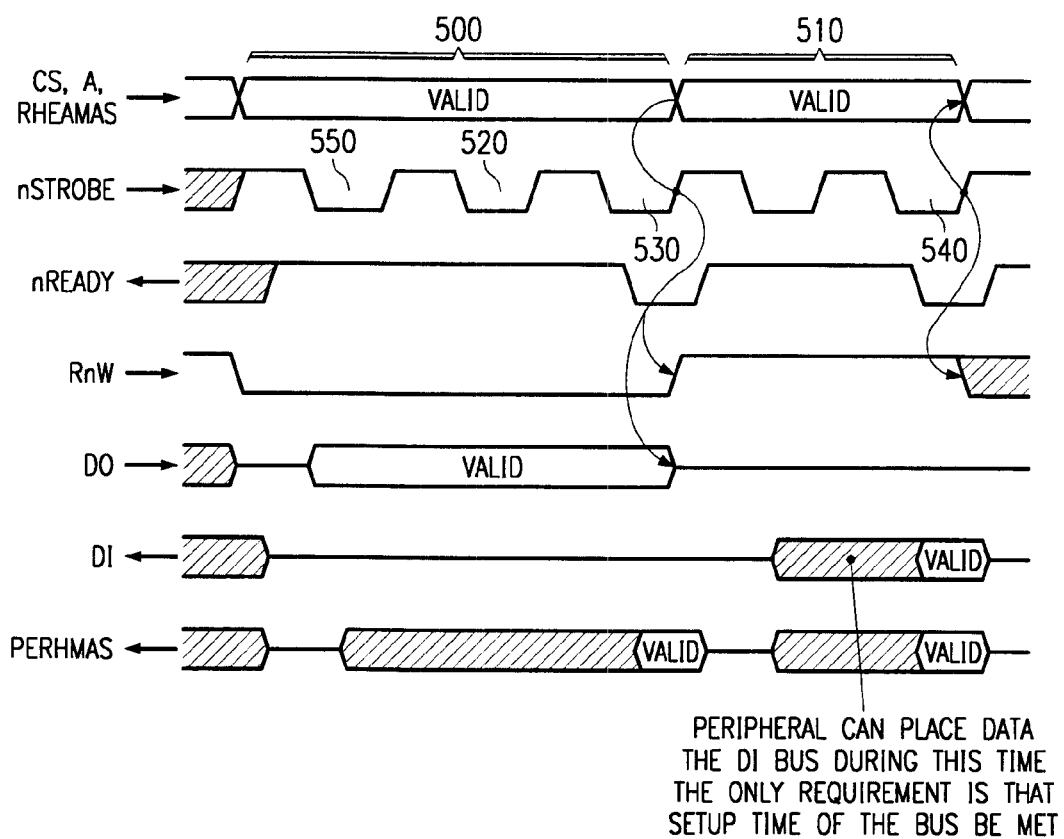
FIG. 5 is a timing diagram of read and write cycles with wait states on the bus of FIG. 2.

FIG. 5 is a timing diagram of read and write cycles with wait states on the bus of FIG. 2 and illustrates the timing for a two wait state write cycle 500 followed by a one wait state read cycle 510. In both cases the cycles are extended by delaying the activation of nREADY. At the beginning of each cycle, bus controller bridge 210 does not know whether the transaction is to be a zero wait state cycle or a non-zero wait state cycle. Therefore, non-zero wait state cycles start in a manner identical to zero wait state cycles.

If the peripheral addressed does not activate the nREADY line in time for the bus controller bridge to register its activation, the cycle will be extended and a second, or more, nSTROBE cycle will be issued. In the case of read cycle 510 in FIG. 5, nREADY is activated when nSTROBE transitions to its active low state during the second cycle 540 of nSTROBE. Read cycle 510 then terminates at the end of the second nSTROBE cycle 540 (when nSTROBE transitions back to logic 1 level). However, in the case of write cycle 500 in FIG. 5, nREADY is not activated during the second cycle 520 of nSTROBE, and bus controller bridge 210 issues a third nSTROBE cycle 530. When nSTROBE transitions to its active low state during the third cycle 530 of nSTROBE, nREADY is activated and the write cycle terminates at the end of the third nSTROBE cycle.

For write cycle 500, the DO bus becomes valid at the falling edge of the first nSTROBE cycle 550 (and some bus controller hosts may present the data even earlier).

Figure 6:
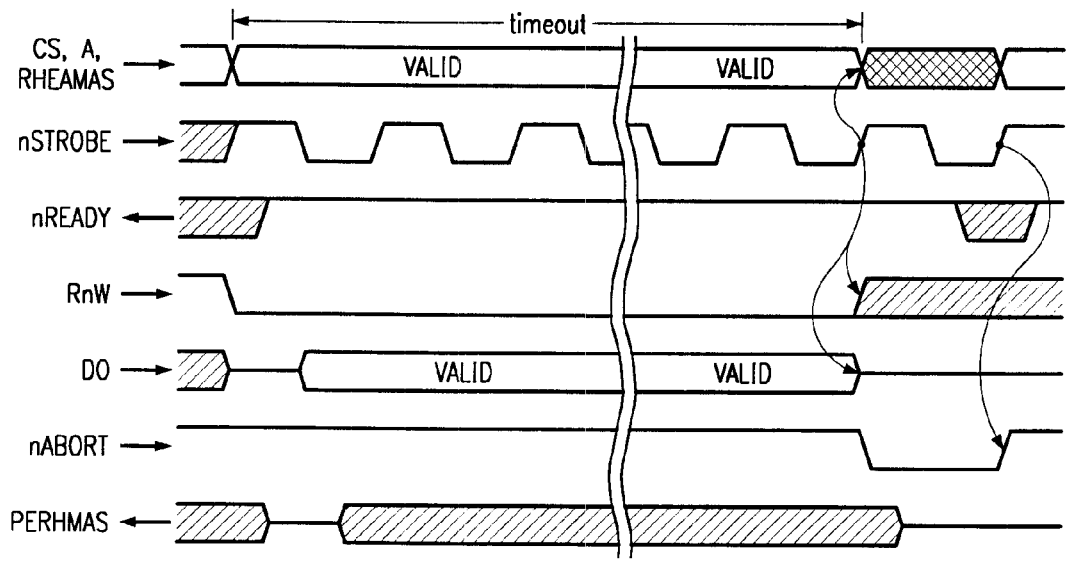
FIG. 6 is a timing diagram of an abort cycle following a "time-out" termination of a write access attempt on the bus of FIG. 2.

FIG. 6 is a timing diagram of an abort cycle following a "time-out" termination of a write access attempt on the bus of FIG. 2. Bus controller bridge 210 can terminate a bus transaction if a predetermined period of time has elapsed and no response (activation of nREADY) has been received from the peripheral. When the predetermined (and, in some bus controller bridge implementations, programmable) timeout period $t_{timeout}$ elapses during a bus transaction, bus controller bridge 210 terminates the transaction and issues nABORT. nABORT informs the peripheral that the transaction was not successfully concluded, and can be used by the peripheral to reset its bus interface logic. FIG. 6 depicts a write transaction that has been aborted by bus controller bridge 210 because nREADY was never received.

Figure 7:
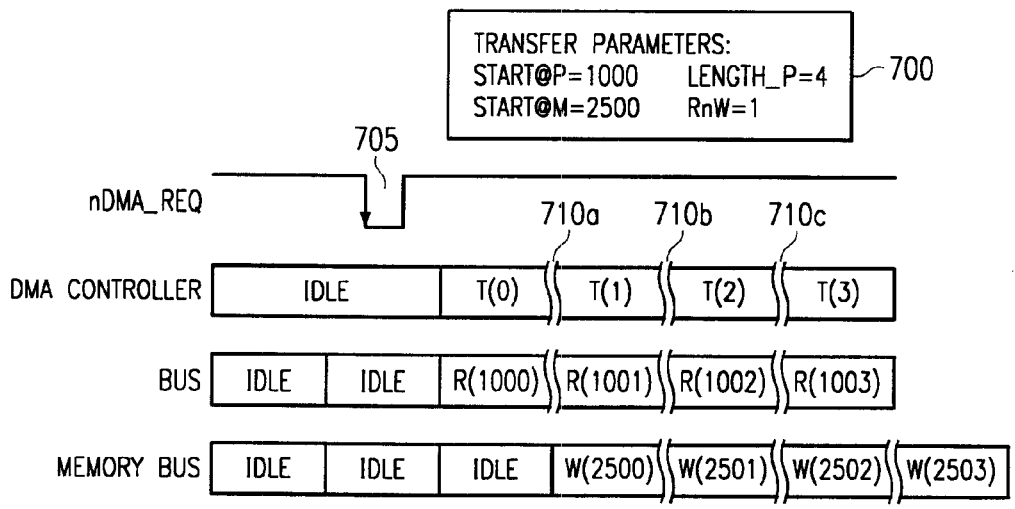
FIG. 7 is timing diagram of a four word, peripheral requested DMA read transaction on the bus of FIG. 2.

FIG. 7 is timing diagram of a four word, peripheral requested DMA read transaction on the bus of FIG. 2. In most applications, system efficiency can be dramatically improved if data transfers between peripherals and host memory are not performed under host control. For this reason, the interconnect bus according to aspects of the present inventions supports direct memory access (DMA) transactions. Each DMA transaction requires access to a DMA channel, and to each DMA channel is assigned a DMA controller. When a DMA transaction is requested, the DMA controller acquires access to interconnect bus 230. It is over bus 230 that the movement of data takes place; according to aspects of the present invention, bus 230 is the DMA channel. An aspect of the present invention is that all transactions, whether DMA transactions or normal host-initiated transactions, have the same read/write format.

Interconnect bus 230 supports single master/multiple slave DMA channels, with bus controller bridge 210 serving always as the master, and the peripherals serving always as the slaves. In most applications, multi-master bus capability is not needed. Typically, all that is required is the ability to move data to and from host memory resources 240 without requiring host CPU 250 intervention.

The parameters governing the DMA transfer are defined by a specific DMA controller implementation, but will typically consist of a set of programmable control registers that determine the block size and transmission conditions of the DMA channel (start addresses, circular/linear addressing, etc.). Furthermore, each DMA channel is typically assigned its own unique set of control registers, thereby providing each channel complete autonomy in operation. In the present embodiment, a DMA controller 700 is included within bus bridge 210.

FIG. 7 shows a typical peripheral-requested DMA transaction. The peripheral unit issues a DMA request 705 on a DMA channel that has been programmed to perform a "read" transaction. The data is retrieved from the peripheral starting at address 1000 and stored in host memory starting at address 2500. For simplicity, the length of the transaction is set at four. After DMA controller 700 acquires interconnect bus 230, the DMA transaction begins with the issuing of a "read" cycle by DMA controller 700. After this read cycle a subsequent write cycle is performed by DMA controller 700 to place the data in host memory 240, and during this write cycle the next sequential read cycle on interconnect bus 230 can also occur. The "breaks" 710(a)–(c) between transfer cycles indicate the possibility that the transaction can be preempted by a higher priority request on a different DMA channel or a higher priority request for the interconnect bus from a peripheral unit or the host processor. Priority-initiated stoppage of DMA transactions can occur after the completion of any given access cycle, and such stoppage is necessary if high order priorities are to be granted rapid access to the interconnect bus.

Figure 8:
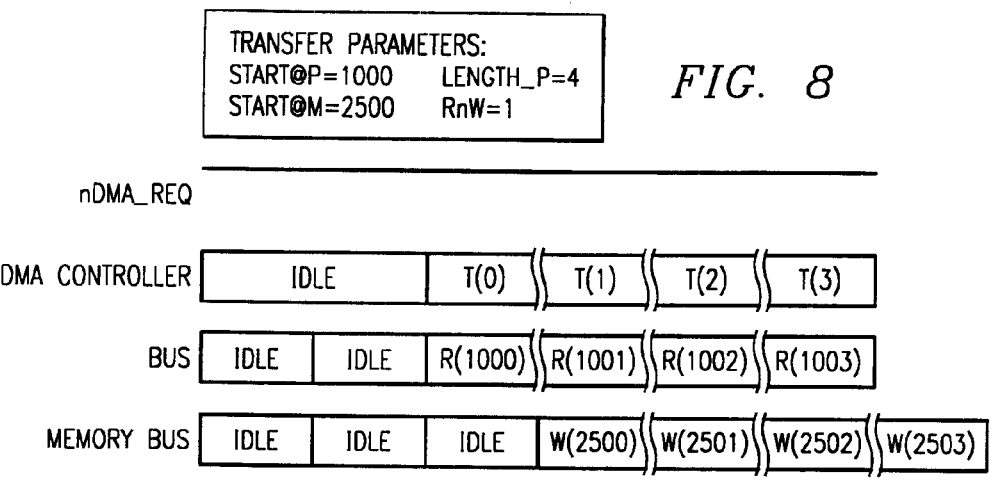
FIG. 8 is timing diagram of a four word, host requested DMA read transaction on the bus of FIG. 2.

FIG. 8 is timing diagram of a four word, host requested DMA read transaction on the bus of FIG. 2. FIG. 8 shows the same transaction as FIG. 7, but without a nDMA_REQ 705 request from the peripheral. Instead, the host has requested the DMA read transaction. This transaction cannot be distinguished from a normal interconnect bus transaction by the addressed peripheral, according to an aspect of the present invention. The peripheral units are not required to incorporate any additional complexity to accommodate DMA transactions, other than the logic required to issue the nDMA_REQ requests. In a system in which all transactions can be conducted under host control, the peripheral need not even implement the nDMA_REQ request logic.

Figure 9:
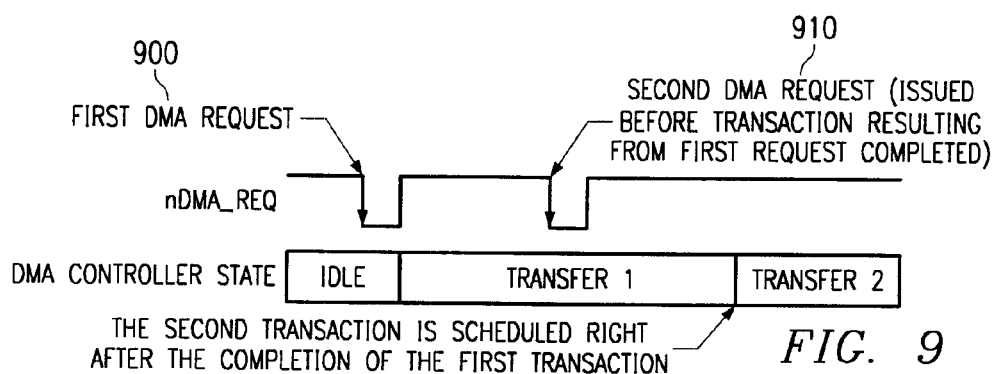
FIG. 9 is timing diagram of queued DMA transactions on the bus of FIG. 2.

FIG. 9 is timing diagram of queued DMA transactions on the bus of FIG. 2. nDMA_REQ lines are negative edge sensitive lines. When a negative edge sensitive DMA request is issued, the transfer will be performed according to its priority level. The choice of negative edge sensitive lines over level sensitive lines is predicated on the issues of Compatibility: Minimum duration active low lines will always have the problem of choosing a minimum duration pulse width that will not restrict access to the channel by making the pulse too long, and will not be too short in duration to meet the "setup" time requirements for different applications.

Simplicity: "Active until serviced" active low lines require circuitry to determine that a given access is a DMA access and not normal interconnect bus traffic.

Another embodiment of an interconnect bus according to aspects of the present invention can use other types of signal sensitivity, such as level sensitivity, for example.

If the peripheral assigned to a DMA channel associated with DMA controller 700 issues another DMA transfer request 910 on the same DMA channel before the current transaction responsive to DMA request 900 is complete, request 910 is queued and scheduled when the DMA channel completes the current transaction. The ability to queue requests is particularly useful for transactions involving one word FIFO memory transfers. Every time the FIFO is accessed, and the access does not result in emptying or filling the FIFO, then another DMA request can be immediately issued. This new request will be queued and honored as soon as the current DMA transaction is completed and the interconnect bus is again acquired for another transaction.

Figure 10:
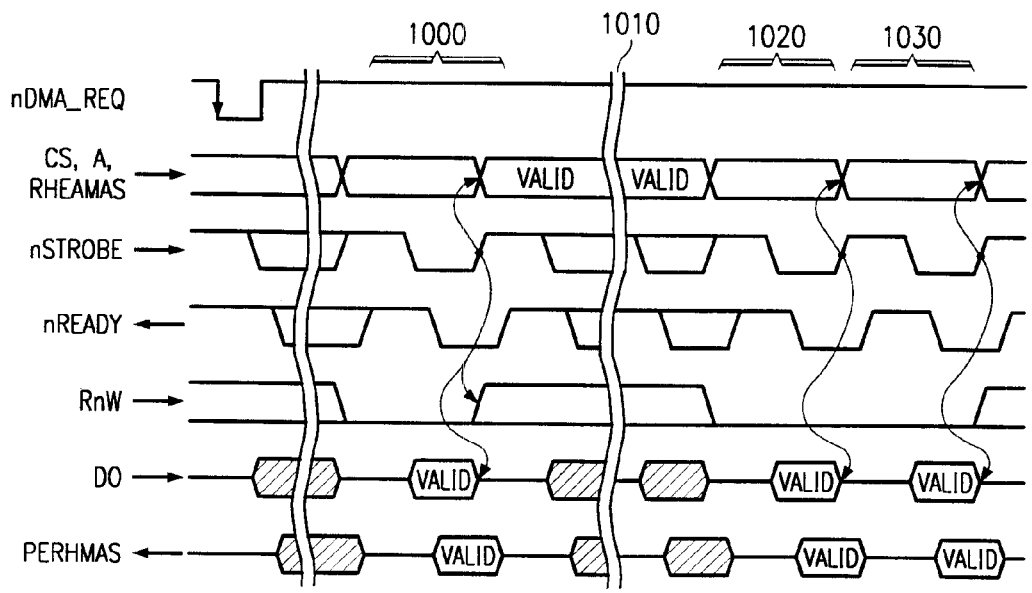
FIG. 10 is timing diagram of DMA write cycles on the bus of FIG. 2.

FIG. 10 is timing diagram of DMA write cycles on the bus of FIG. 2. FIG. 10 shows a sequence of DMA write cycles occurring after a peripheral has issued nDMA_REQ and the interconnect bus has been acquired by DMA bus controller 700. After the first write cycle 1000, the DMA process is interrupted as the interconnect bus has been assigned to a higher priority request (indicated by "break" 1010). When this higher order request has been serviced, the interconnect bus is reacquired by the DMA controller and the process resumes with DMA write cycles 1020 and 1030, for example. Each DMA write cycle is indistinguishable from a normal host-initiated write cycle on the interconnect bus.

Figure 11:
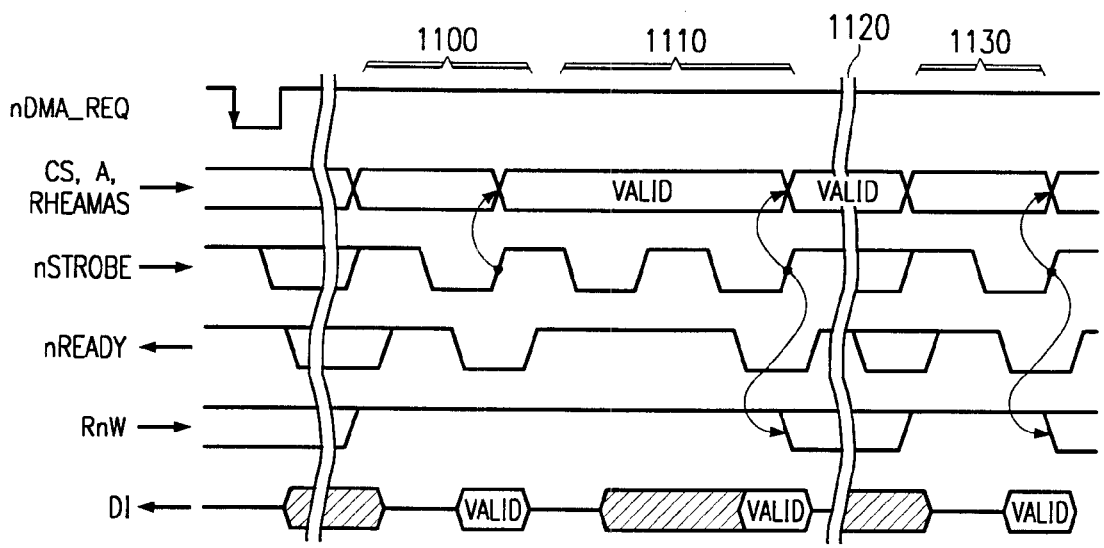
FIG. 11 is timing diagram of DMA read cycles on the bus of FIG. 2.

FIG. 11 is timing diagram of DMA read cycles on the bus of FIG. 2. FIG. 11 shows a sequence of DMA read cycles. The first two read cycles 1100 and 1110 occur uninterrupted, and are indistinguishable from normal host-initiated interconnect bus read cycles. In the second read cycle 1110, the peripheral delays the activation of nREADY until the second nSTROBE cycle, thereby creating a one wait state cycle, exactly as is done in non-DMA transactions. Again, there is no difference, from a peripheral point of view, between a DMA transaction and a normal host-initiated interconnect bus transaction. After the second read transaction, the DMA process is interrupted by a higher priority request, illustrated by "break 1120." When the interconnect bus can again be acquired by DMA controller 700, the DMA process resumes with DMA read cycle 1130.

Figure 12:
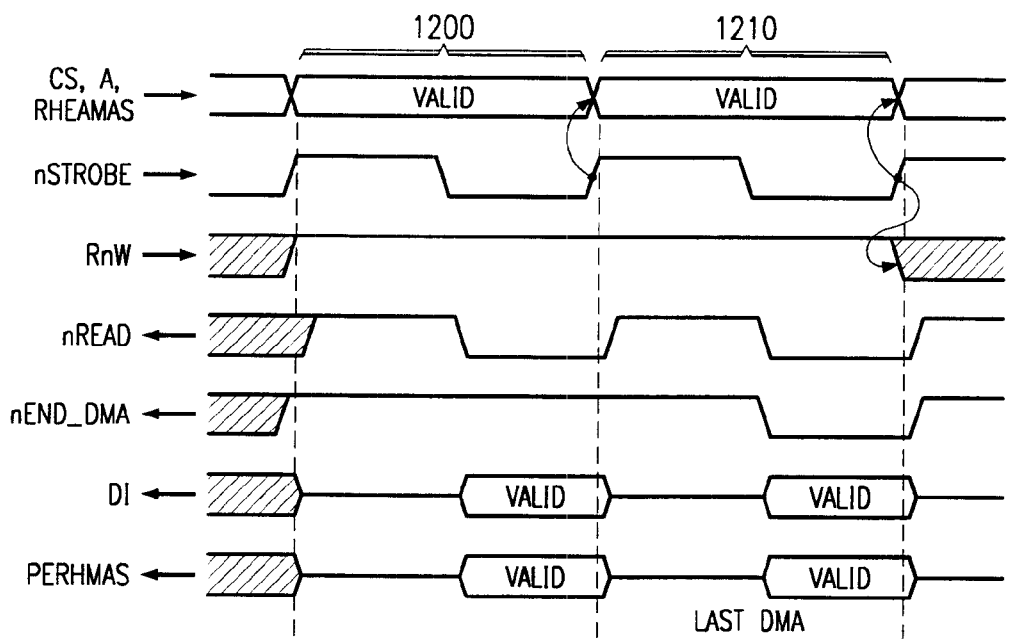
FIG. 12 is timing diagram of peripheral-initiated termination of DMA read cycles on the bus of FIG. 2.

FIG. 12 is timing diagram of peripheral-initiated termination of DMA read cycles on the bus of FIG. 2, according to an aspect of the present invention. Peripherals can request that any given DMA transaction be terminated by setting the nEND_DMA line to the active low level. nEND_DMA has the same timing requirements as nREADY. If the peripheral wishes to end the DMA transaction at the end of the current nSTROBE cycle, nEND_DMA must be set low prior to the rising edge of nSTROBE, in time to satisfy the setup time required by the bus controller. nEND_DMA is provided on the interconnect bus to efficiently service peripherals with FIFO type memory resources. These types of memory resources often require data block transfers that vary in length, and typically the length of any given transaction is unknown to the host processor. Since the peripheral can terminate the DMA process at the conclusion of any given cycle by using the nEND_DMA signal, the host is only required to program DMA controller 700 for the maximum block length possible and rely on the peripheral to terminate the process when no more data can be processed.

Read access 1200 shown in FIG. 12 is not the last read cycle of the transaction as nEND_DMA is maintained at its inactive high state. However, read access cycle 1210 is the last read cycle of the transaction as nEND_DMA is set active low when nSTROBE transitions to the active low state.

Figure 13:
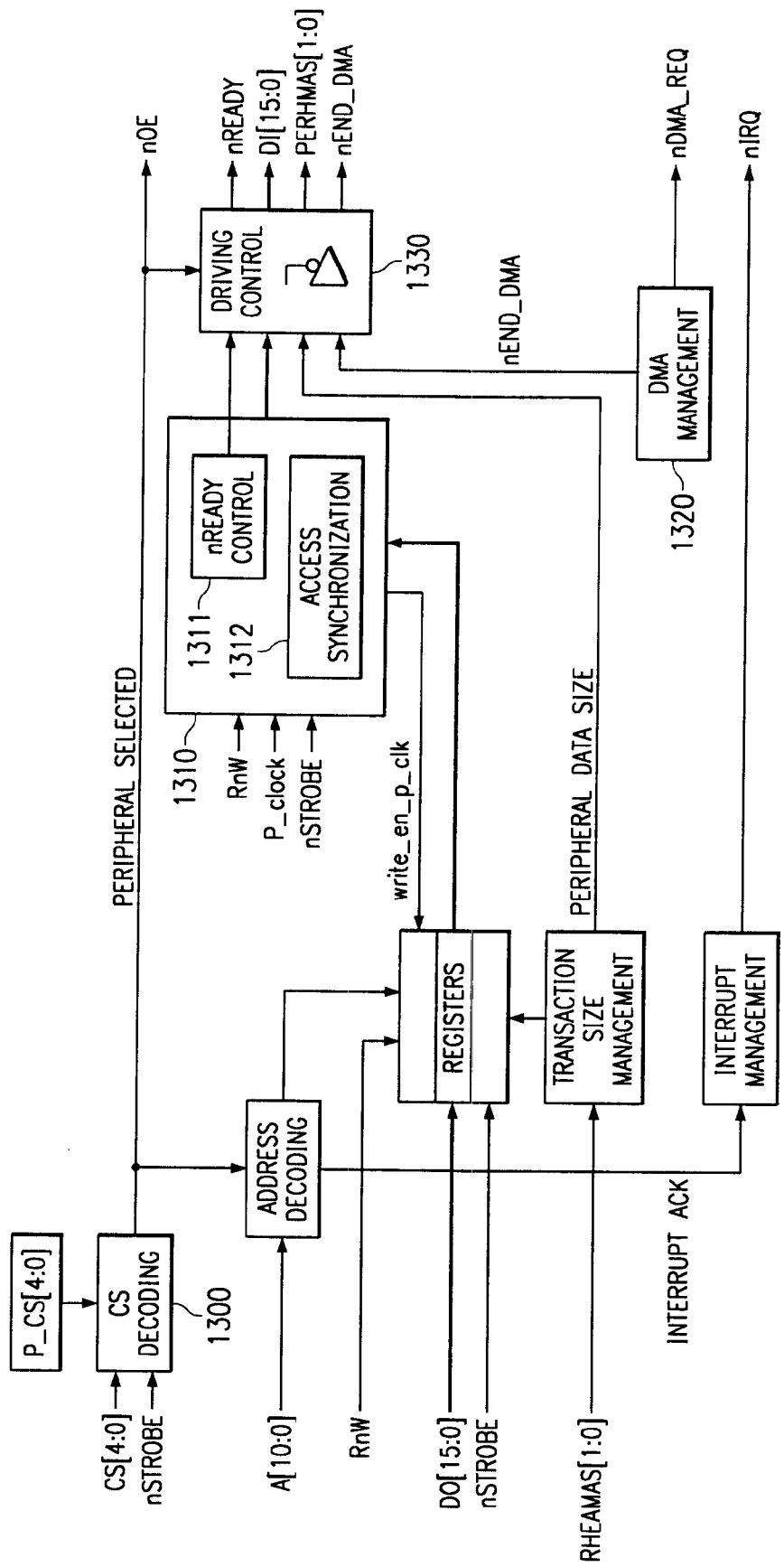
FIG. 13 is a block diagram of generic bus interface for a peripheral connected to the bus of FIG. 2.

FIG. 13 is a block diagram of a generic interconnect bus interface for a peripheral connected to the bus of FIG. 2, which contains aspects of the present inventions. CS decoding circuit 1300 compares preselected peripheral identification signals P_CS(4:0) uniquely provided by each peripheral 220 with bus signals CS(4:0) and generates signal nOE when a match occurs to select a particular peripheral. Tristate buffers 1130 are enabled in response to signal nOE.

Control circuitry 1310 includes nREADY circuitry 1311 and synchronization circuitry 1312 for forming response signal nREADY, as described above. Synchronization circuitry 1312 will be described in more detail below.

DMA management circuitry 1320 forms nDMA_REQ and nEND_DMA signals, as discussed above.

This interface can be used when the read and write access must be synchronized on a peripheral clock signal that is asynchronous with the host 200 clock signal. The interconnect bus transactions are delayed using the nREADY flag during the access synchronization.

An aspect of the present invention is that synchronization can be preformed for interconnect bus transactions without the need to distribute a host clock signal to the peripheral. This has the advantage of saving a signal line and more importantly it reduces power consumption with the digital system. During a write cycle, synchronization assures that transient erroneous values are not captured by the peripheral. During a read cycle, synchronization assures that if the addressed register value can be modified synchronously with the peripheral clock, the read access is re-synchronized to ensure data stability.

In general, according to an aspect of the present invention, synchronization between the interconnect bus and a peripheral is performed by using pulses which occur on the nSTROBE signal and a clock signal which is local to the peripheral, denoted as p_clock. The pulses on the nSTROBE signal are synchronous with the host clock signal. However, pulses on the nSTROBE signal only occur in response to an active interconnect bus transaction, as discussed above. Thus, advantageously, a free-running clock signal that is synchronous to the host does not need to be provided to the peripheral. Advantageously, power dissipated by a digital system constructed using the interconnect bus according to the present invention is reduced by eliminating the need to provide a free running clock signal to the interface of each peripheral.

Figure 14:
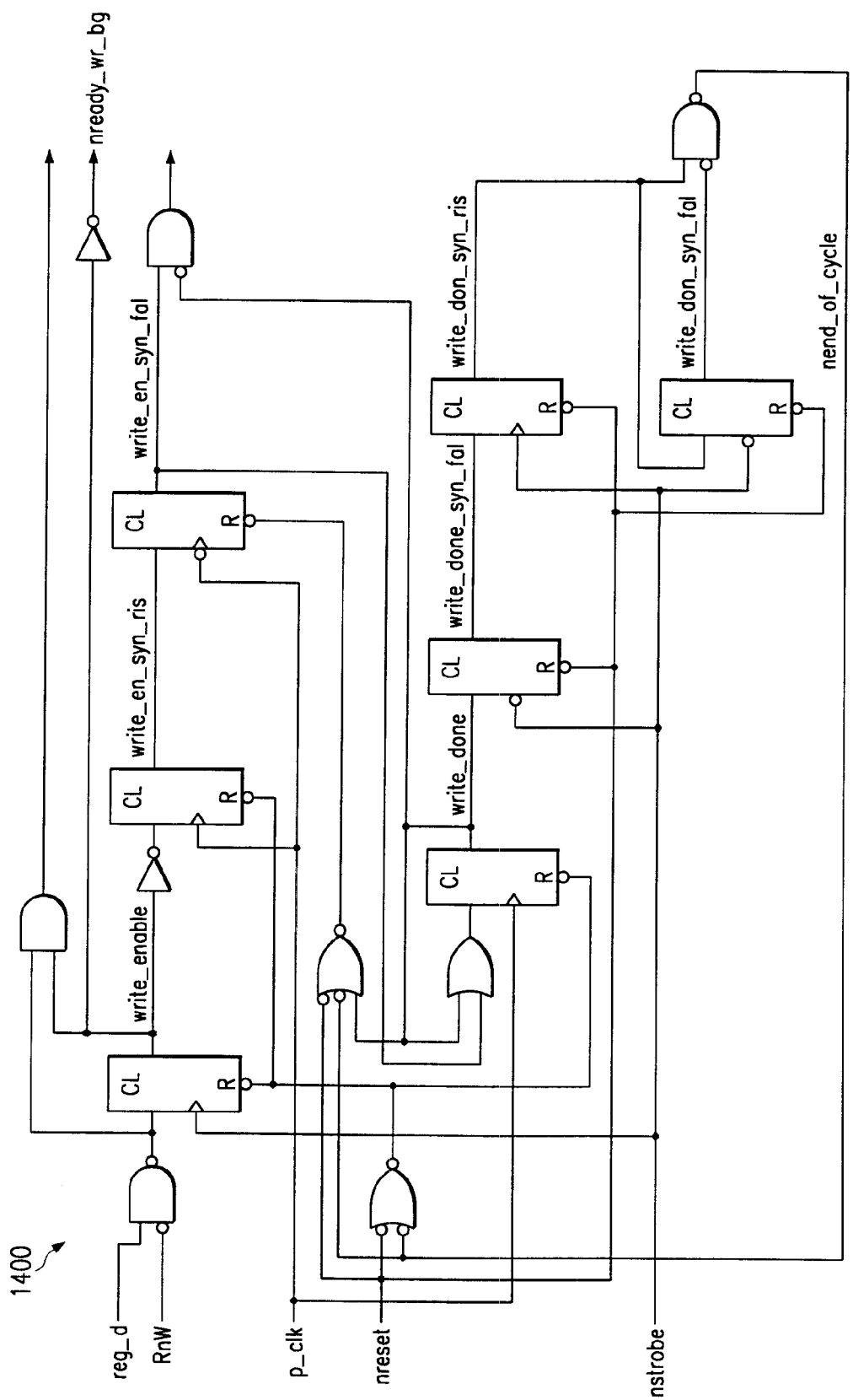
FIG. 14 is a schematic of an ASIC cell for a background synchronizer according to an aspect of the present invention.

FIG. 14 is a schematic of an application specific integrated circuit (ASIC) cell 1400 for a background synchronizer according to an aspect of the present invention. ASIC cells are commonly used during the design of a digital system and are often provided in libraries with a large number of pre-designed cells that can be selected and combined to form a complete ASIC. While an embodiment of an aspect of the present invention will be described with reference to an ASIC cell, this should not be taken as a limitation of the present invention.

Figure 15:
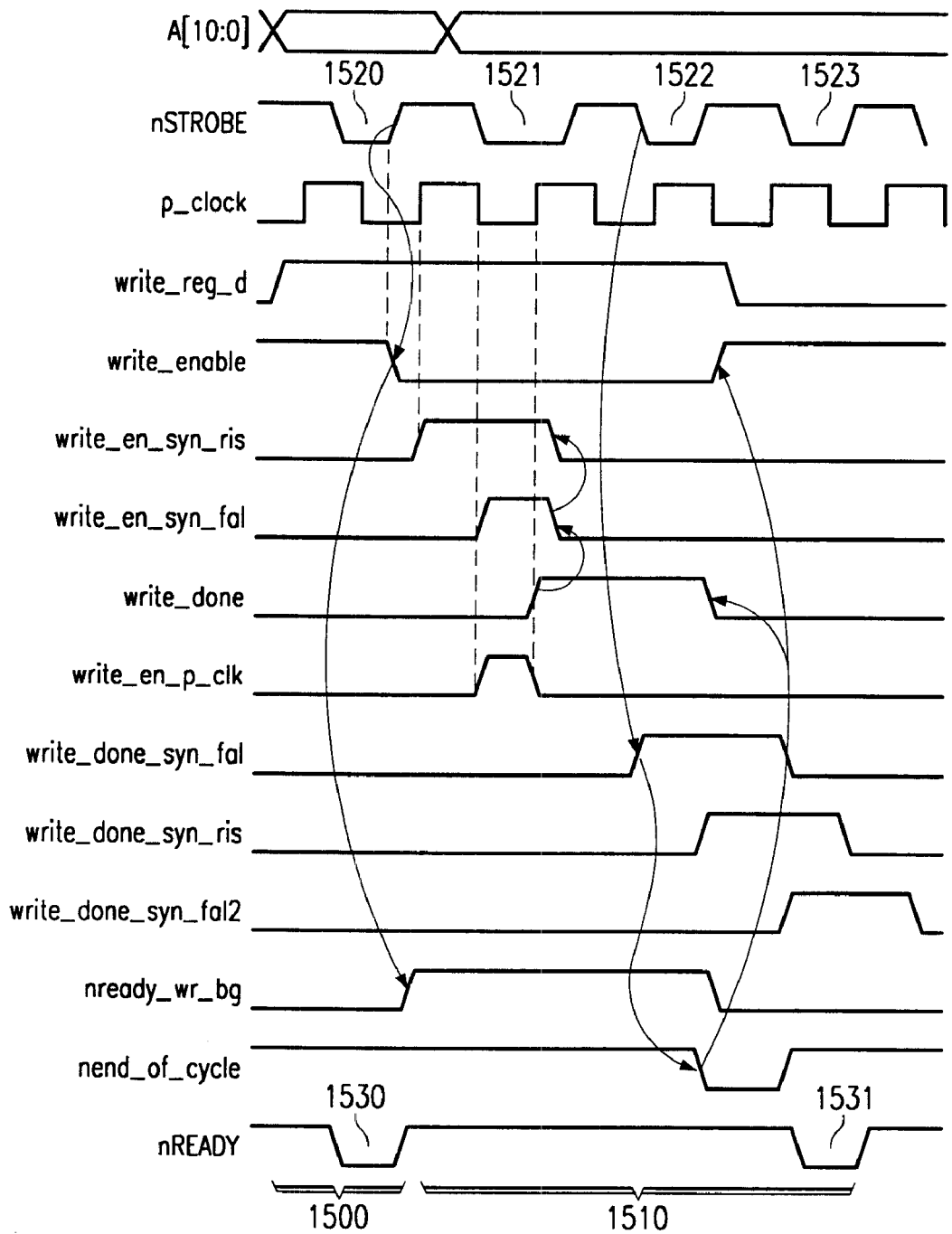
FIG. 15 is a timing diagram of the background synchronizer cell of FIG. 14.

FIG. 15 is a timing diagram of the background synchronizer cell of FIG. 14. An aspect of the present invention is that an interconnect bus transaction can be synchronized in background so that a current write cycle is not delayed. However, in the case of two consecutive write accesses on the same register, the second access could be delayed if the synchronization of the first one is not already finished. A first write cycle 1500 is completed as a no-wait state transaction, while immediately following second write cycle 1510 is delayed while synchronization circuit 1400 completes the synchronization of the first write cycle.

nSTROBE pulse 1520 indicates first write transaction 1500 while nREADY pulse 1530 indicates the completion of a no-wait state first write transaction 1500. nSTROBE 1521 indicates the beginning of the second write transaction 1510 while nREADY pulse 1531 indicates the completion of a wait stated write transaction 1510. According to an aspect of the present invention, synchronization of write transaction 1500 is completed in background by using nSTROBE pulses 1521 and 1522 without the need for a free running clock signal from the host. Furthermore, if nSTROBE pulses 1521 and 1522 were associated instead with transactions to different registers, synchronizer circuitry 1400 would have still completed the background synchronization sequence.

Figure 16:
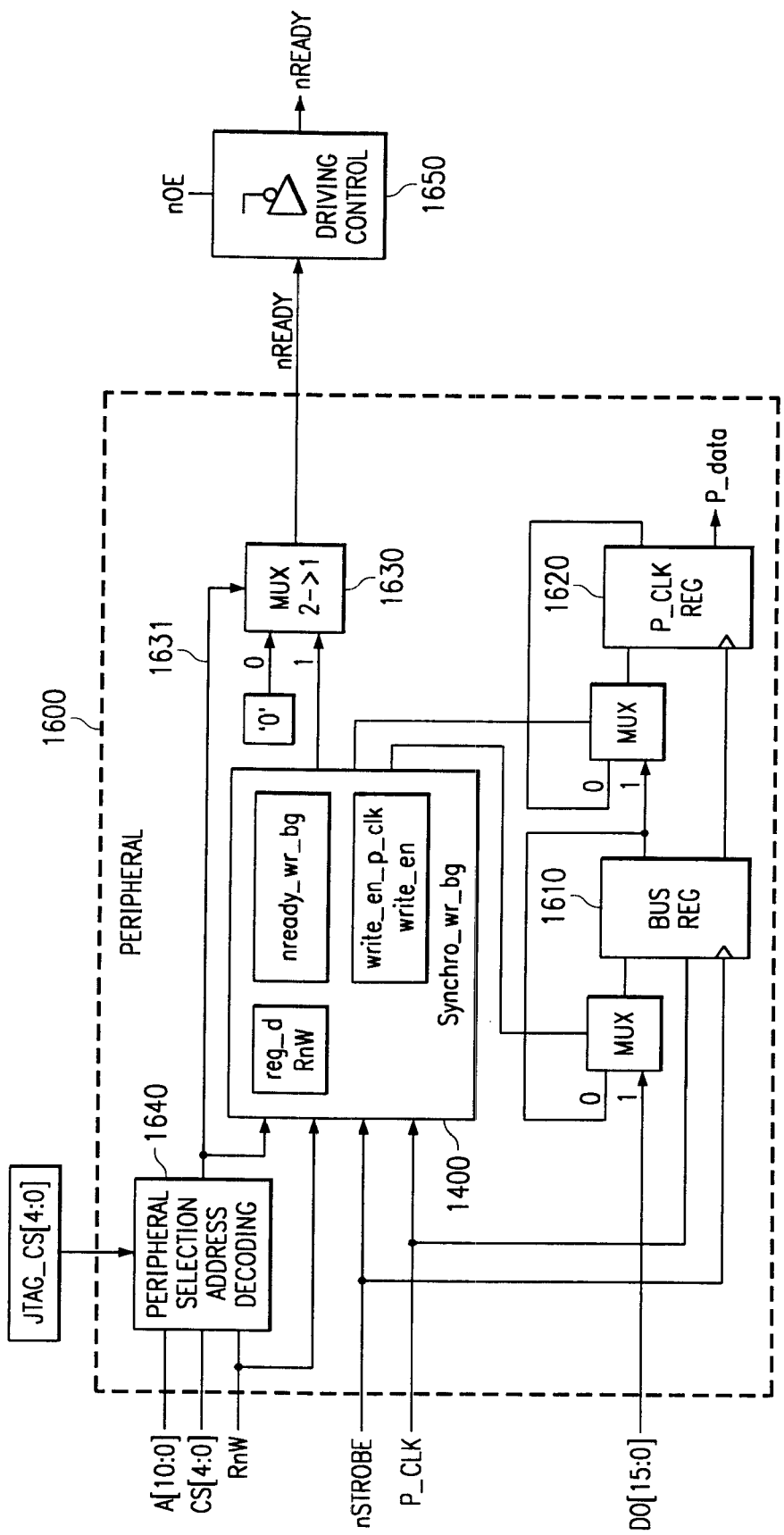
FIG. 16 is a block diagram of a peripheral interface which includes the background synchronizer cell of FIG. 14.

FIG. 16 is a block diagram of a peripheral interface that includes the background synchronizer cell 1400 of FIG. 14. Bus register 1610 is enabled to receive first data from bus signals DO during no-wait transaction 1500 by signal write_en. After background synchronization, peripheral register 1620 is write-enabled by signal write_en_p_clk to receive the data stored in bus register 1610. This transfer is done synchronously with p_clk. Bus register 1610 is then again enabled by signal write_en to receive second data from bus signals DO from write transaction 1510.

Address decoding circuitry 1640 determines which register is being written to in response to address bus signals A(10:0). If a selected register transfer does not need to be synchronized to p_clk, then mux 1630 selects "0" from a first input to form a no wait-state nREADY signal in response to signal 1631 from decoding circuitry 1640. Alternatively, if a selected register transfer requires p_clk synchronization, then a second input on mux 1630 is selected to provide signal nready_wr_bg to tri-state buffer 1650, which is connected to drive the nREADY signal. FIG. 15 illustrates the operation of the nREADY signal in the case of two sequential writes to the same register, described above.

The time latency for the transfer data from bus register 1610 to the P_clk register 1620 is a minimum of 1 P_CLK period and a maximum of 2 P_CLK periods. The time latency between two consecutive write transactions to the same register, in which the second access is delayed due to the synchronization of the first one not being finished, is a minimum of 1 P_CLK period+2 nSTROBE period and a maximum of 2 P_CLK period+3 nSTROBE periods.

Figure 17:
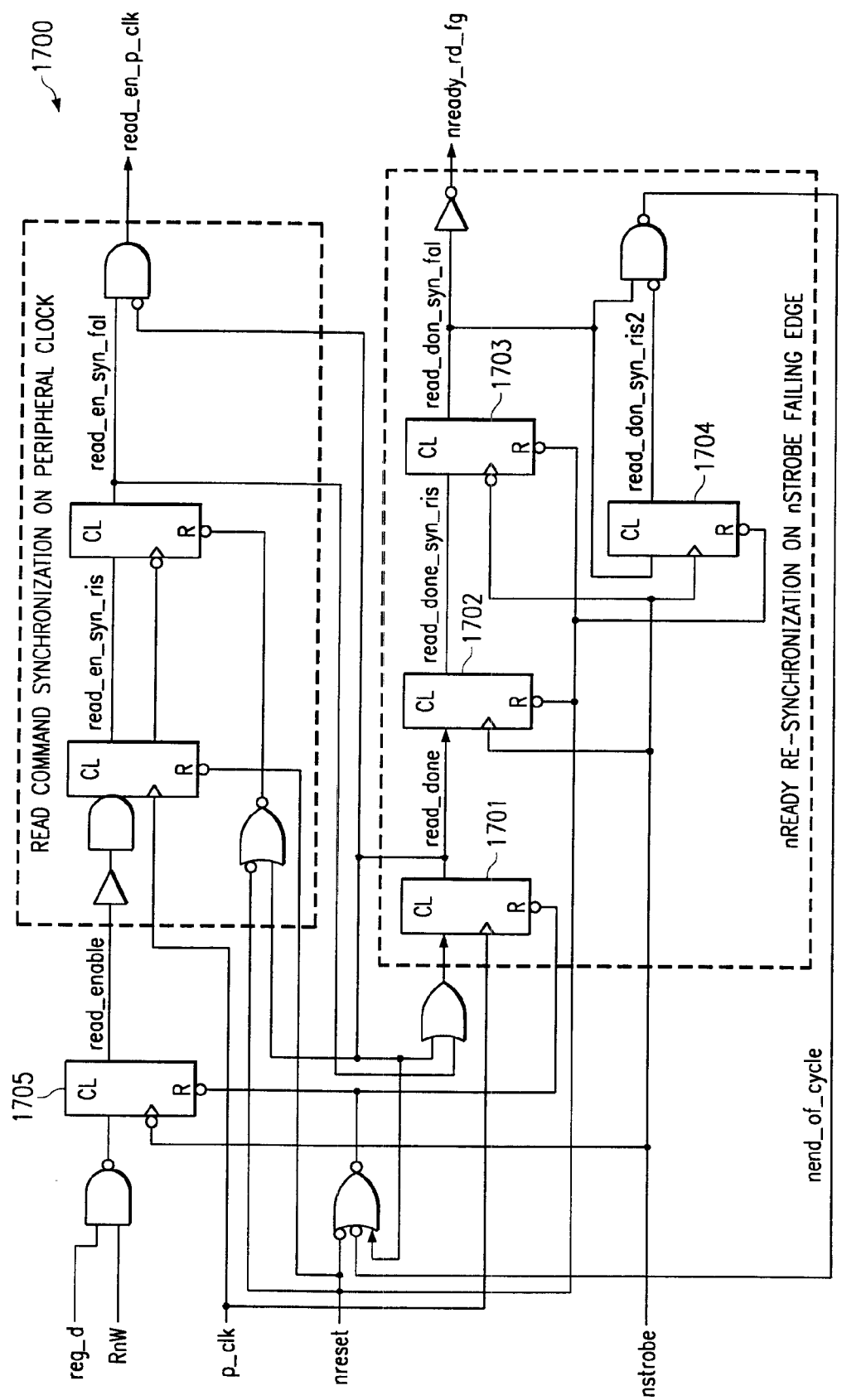
FIG. 17 is a schematic of an ASIC cell for a foreground synchronizer according to an aspect of the present invention.

FIG. 17 is a schematic of an ASIC cell 1700 for a foreground synchronizer according to an aspect of the present invention. In this case, synchronization is done in foreground which means that the current read access is postponed while synchronization is performed.

The nREADY_syn high to low transition must be synchronized on nSTROBE falling edge to be compliant with nREADY setup time requirement. This synchronization is done with three flip-flop latches and the reinitialization of some internal latches is done with a latch 1704. Latch 1701 is a DFF register with an asynchronous reset input. It prevents the nSTROBE signal from being low level active before the peripheral value read. Latches 1702 and 1703 are clocked on nSTROBE positive and negative edge, respectively. It synchronizes the latch 1 output on nSTROBE falling edge.

Latch 1704 enables reinitialization of latches 1701 and 1705 between the read_done_syn_fal low to high transition (on the falling edge of nSTROBE) and the read_done_syn_ris_2 low to high transition (on the rising edge of nSTROBE) at the end of the peripheral value read cycle.

The tiime latency for a synchronized read transaction is a minimum 1 P_CLK period.+2 nSTROBE period and a maximum of 2 P_CLK period+4 nSTROBE period.

Figure 18:
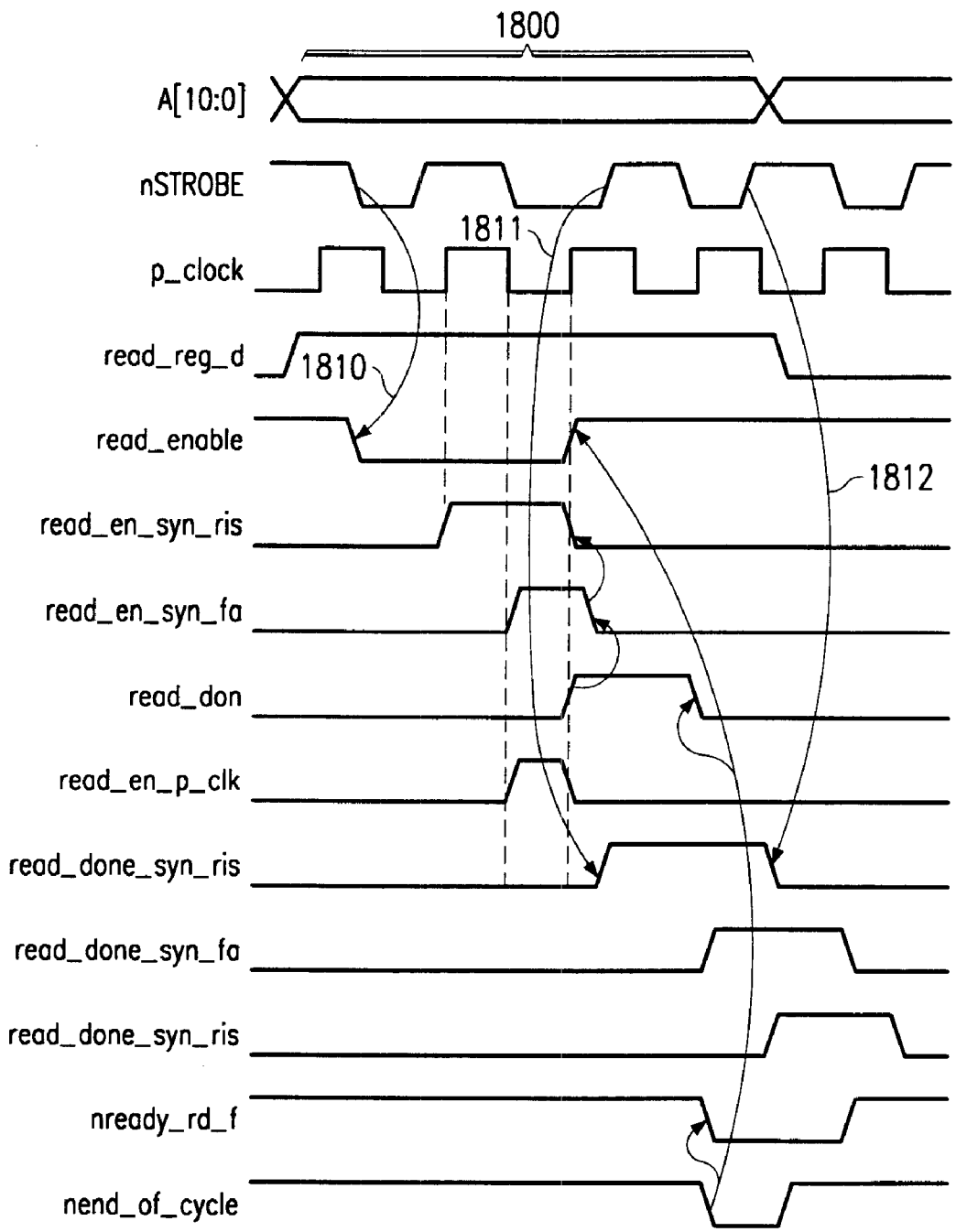
FIG. 18 is a timing diagram of the foreground synchronizer cell of FIG. 17.

FIG. 18 is a timing diagram of the foreground synchronizer cell of FIG. 17, which illustrates a single read transaction 1800. According to an aspect of the present invention, transitions of the nSTROBE signal 1810-1812 are used to synchronize transfer 1800 to the host clock signal without the need for a free running clock signal from the host.

Figure 19:
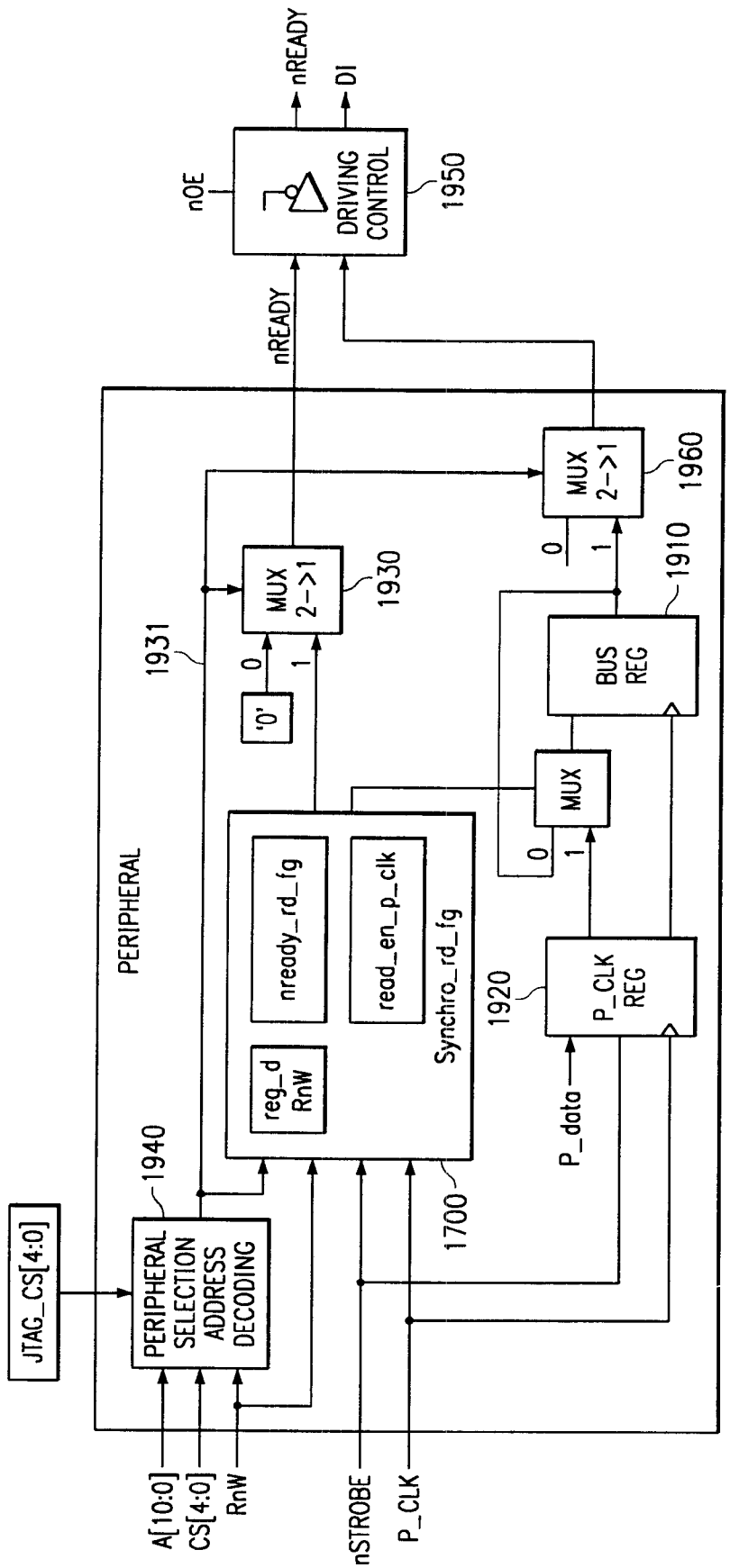
FIG. 19 is a block diagram of a peripheral interface which includes the foreground synchronizer cell of FIG. 17.

FIG. 19 is a block diagram of a peripheral interface which includes the foreground synchronizer cell of FIG. 17. P_clk register 1920 receives data from a peripheral data bus P_data in response to a p_clk signal. In response to read access 1800, synchronizer circuit 1700 enables data to be transferred to bus register 1910 in response to signal read_en_p_clk.

Address decoding circuitry 1940 determines which register is being read from in response to address bus signals A(10:0). If a selected register transfer does not need to be synchronized to p_clk, then mux 1930 selects "0" from a first input to form a no wait-state nREADY signal in response to signal 1931 from decoding circuitry 1940. Alternatively, if a selected register transfer requires p_clk synchronization, then a second input on mux 1930 is selected to provide signal nready_wr_fg to tri-state buffer 1950, which is connected to drive the nREADY signal. Mux 1960 is selected to provide data from bus register 1910 to the interconnect bus signals DI via tri-state driver 1950.

The time for access synchronization on the peripheral clock increases the access duration. In some applications where the interconnect bus throughput is critical, the access synchronization during the data transfer access could be avoided. For instance, no access synchronization is required in read or write access to a FIFO because the FIFO function insures the read and write access are done on different data. Nevertheless, the FIFO control mechanism needs to monitor the read and write transactions in order to compute the FIFO state (full/empty). This control has to resynchronized the access on a same clock.

Figure 20:
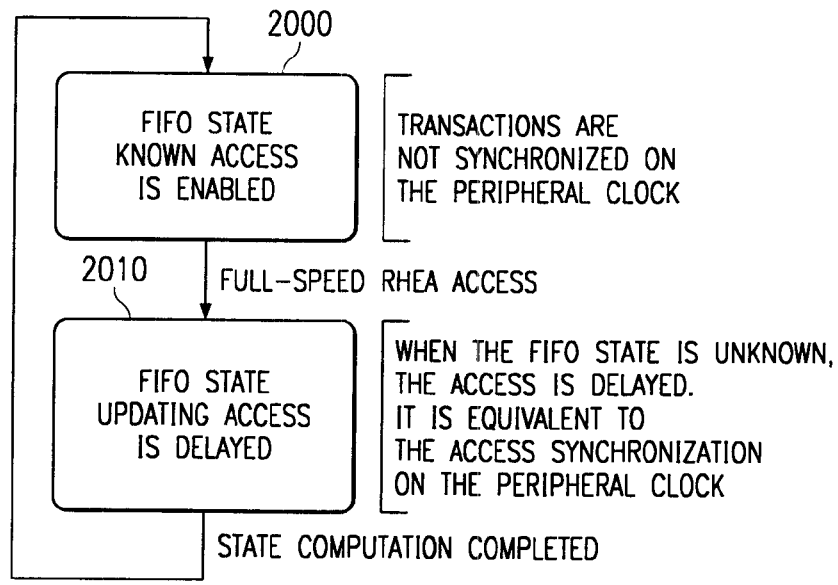
FIG. 20 defines a wait-state insertion scheme for FIFO transfers on a bus according to aspects of the present invention.
Figure 21:
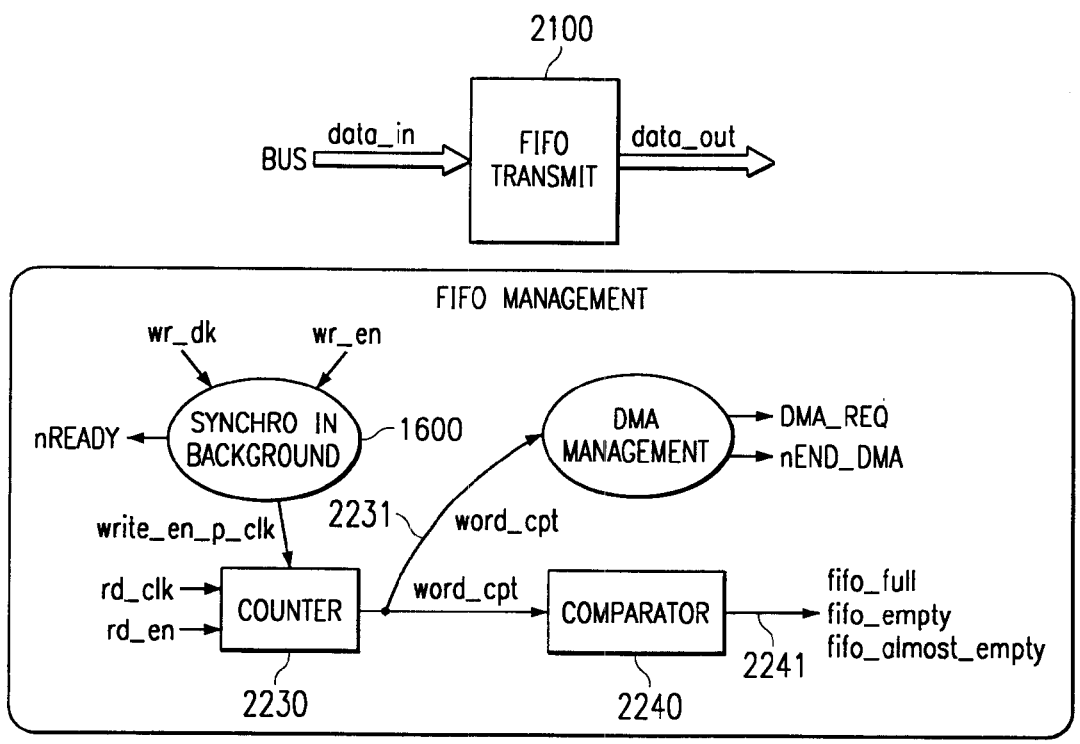
FIG. 21 is block diagram of a write FIFO buffer in accordance with FIG. 20.

FIG. 20 defines a wait-state insertion scheme for FIFO transfers on a bus according to aspects of the present invention. Typically, the FIFO is an interface whose access can be done at full speed (no wait state) when the FIFO state is known before the transaction, as in state 2000. If the FIFO state is not known when an access is done as in state 2020, then wait states are inserted to postpone the transaction. FIG. 21 is block diagram of a transmit FIFO buffer 2100 in accordance with FIG. 20.

This access synchronization mechanism allows transfer of data at the full interconnect bus speed if the time between two access is longer then the time to update the peripheral state.

Figure 22:
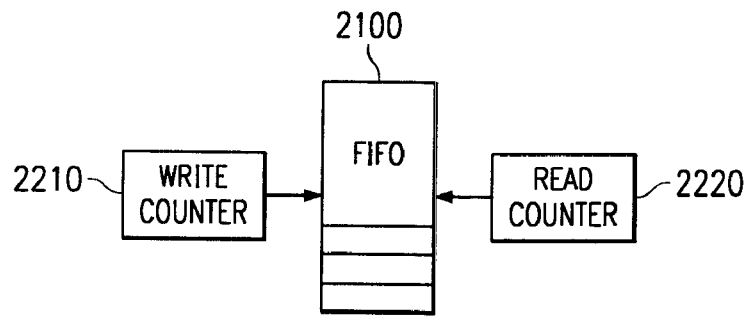
FIG. 22 is a block diagram of a controller for the write FIFO buffer of FIG. 21.

FIG. 22 is a block diagram of a controller for the transmit FIFO buffer of FIG. 21. Synchronizer circuitry 1600 generates the nREADY signal, as discussed with reference to FIGS. 14–16. Using this synchronization mechanism, two consecutive accesses can be done without any wait-state if the time between them is longer than the peripheral state computation time. A write counter 2210 is incremented on peripheral clock rising edge. This counter is incremented only if the signal nREADY generated by synchronization circuitry 1600 is equal to zero. A read counter 2220 is incremented in response to nSTROBE rising edges. Counter 2230 provides a count signal 2231 indicating the number of words in the FIFO and is incremented in response to a completed write transfer from the peripheral to the FIFO and decremented in response to a completed read transaction on the interconnect bus. Comparator circuitry 2240 provides a signal 2241 which indicates the state of the FIFO, in response to word count signal 2231.

For a receive FIFO (not shown) for interconnect bus read transactions, a similar arrangement is used.

As discussed earlier, DMA request circuitry is an option on the interconnect bus which allows a peripheral to request a data transfer on the interconnect bus. For each FIFO with DMA capability, nDMA_REQ and nEND_DMA are generated by a state machine in a first embodiment. In another embodiment, other circuitry design techniques can be used to generate nDMA_REQ and/or nEND_DMA, such as random logic, for example.

Figure 23:
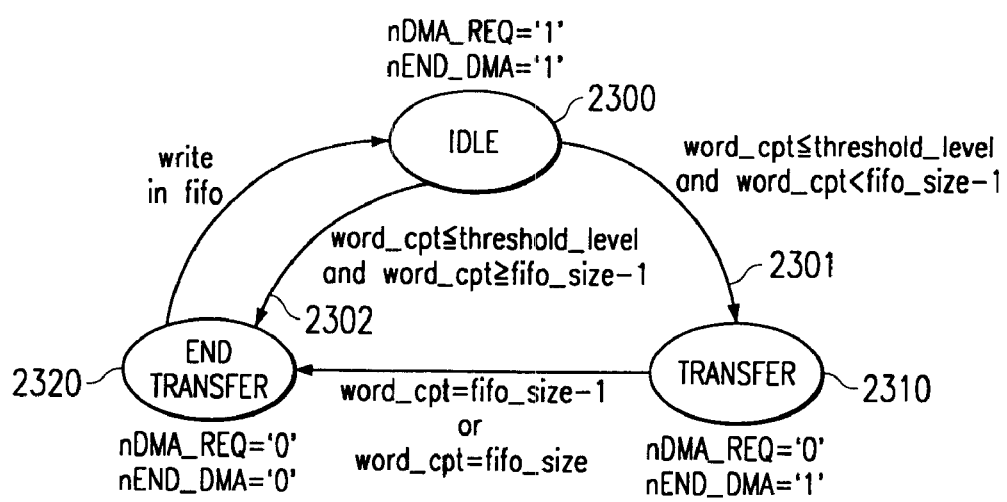
FIG. 23 is a state diagram of the controller of FIG. 22 performing DMA write transactions.

FIG. 23 is a state diagram of the controller of FIG. 22 performing DMA transmit transactions, that is, DMA is used to transmit data to the FIFO from the host memory and the peripheral fetches the data from the FIFO. The DMA controller performs data transfers when the FIFO is almost empty (word_cpt<threshold). A threshold value is selected and provided to the comparator circuitry 2240 for determining when the FIFO is almost empty.

When the FIFO is almost empty, the FIFO management state machine requests a DMA transfer by asserting the nDMA_REQ signal on the interconnect bus, thus transitioning from idle state 2300 to transfer state 2310 along arc 2301. The DMA controller transfers several data words until the FIFO becomes full, as indicated by comparator 2240 (word_cpt=FIFO_size). Then the FIFO state machine controller transitions to end transfer state 2320 and asserts the END_DMA signal to stop the DMA transfer and then transitions to IDLE state 2300.

In the case where the FIFO size is small, such as a one or two word FIFO, then the FIFO state machine transitions directly from idle state 2300 to end transfer state 2320 along arc 2302. A single data item is transferred on the interconnect bus by asserting nDMA_REQ and nEND_DMA simultaneously. The state machine then transitions to idle state 2300.

Figure 24:
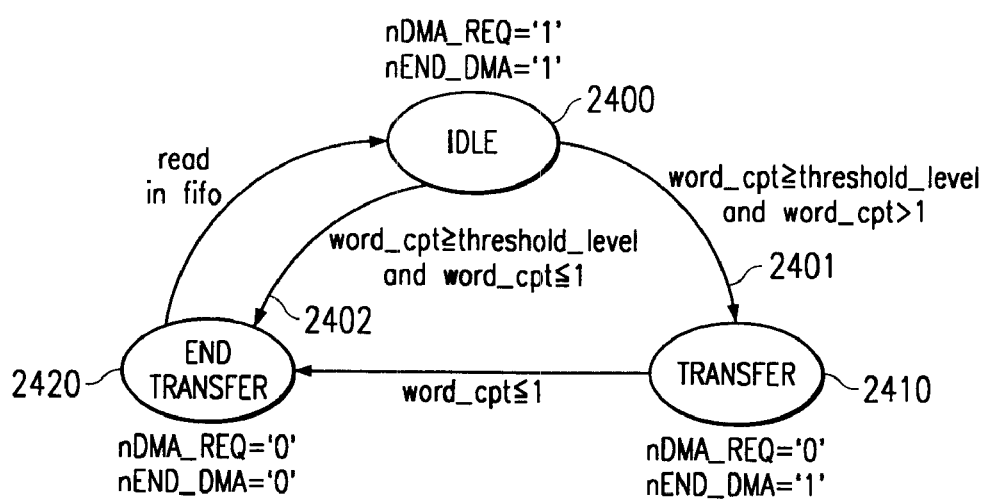
FIG. 24 is a state diagram for performing DMA read transactions.

FIG. 24 is a state diagram for performing DMA read transactions, that is, DMA is used to read data from the FIFO and to place it in the host memory while the peripheral places data in the FIFO. While in idle state 2400, the peripheral places data in the FIFO and the word count is increased. Once the word count is greater than a preselected threshold value, the state machine transitions to transfer state 2410 along arc 2401 if the word count is greater than 1. DMA transfers are requested until the word count is reduced to 1, and then the state machine transitions to end transfer state 2420 to end the DMA transaction and then to idle state 2400.

In the case the FIFO size is small, then the state machine transitions directly from idle state 2400 to end state 2420 along arc 2402 and only a single data item is transferred on the interconnect bus.

Advantageously, according to an aspect of the invention, the peripheral controls the data flow for both read and write DMA transactions by controlling signals nDMA_REQ and nEND_DMA.

Figure 25A:
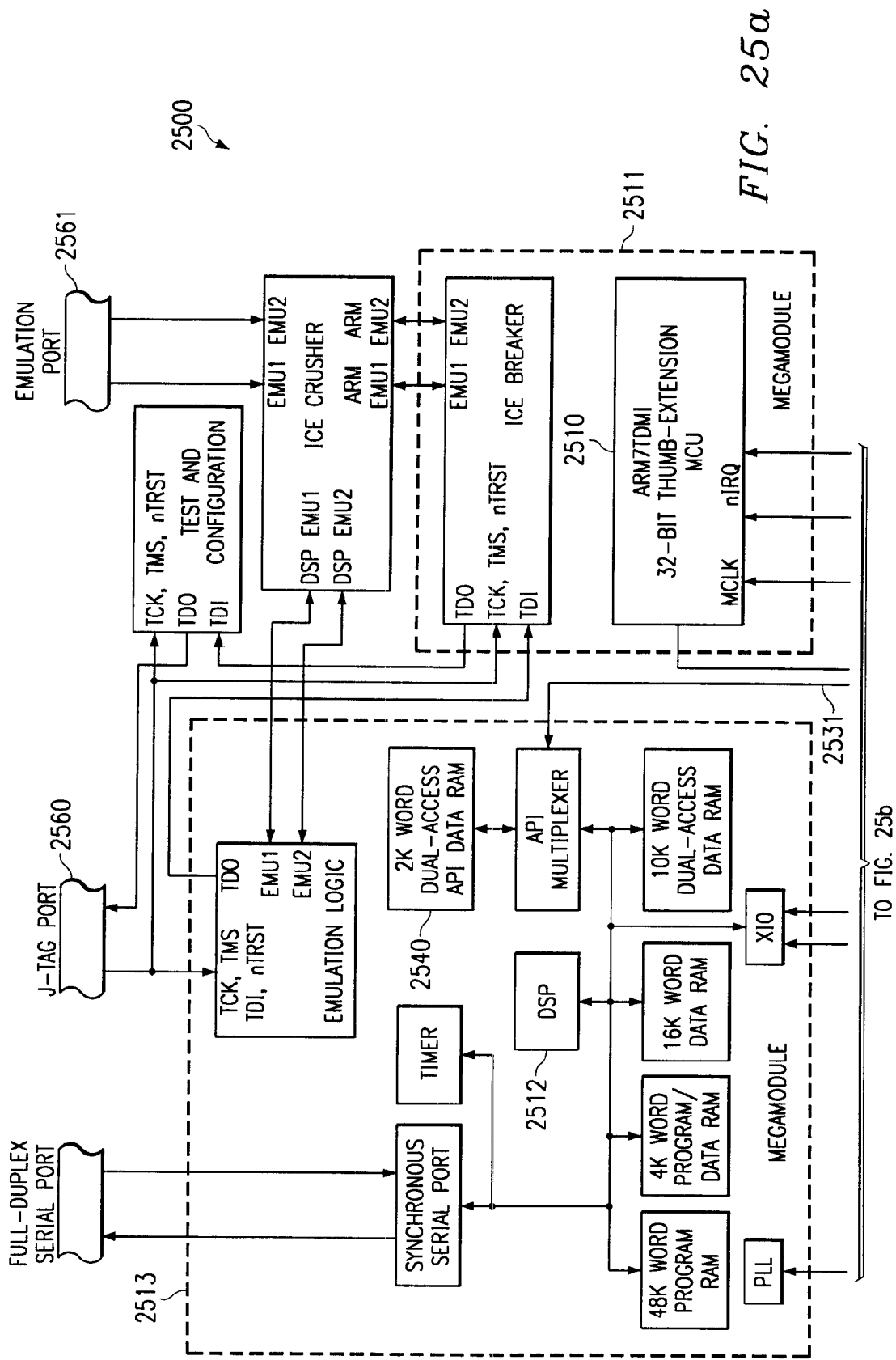
Figure 26:
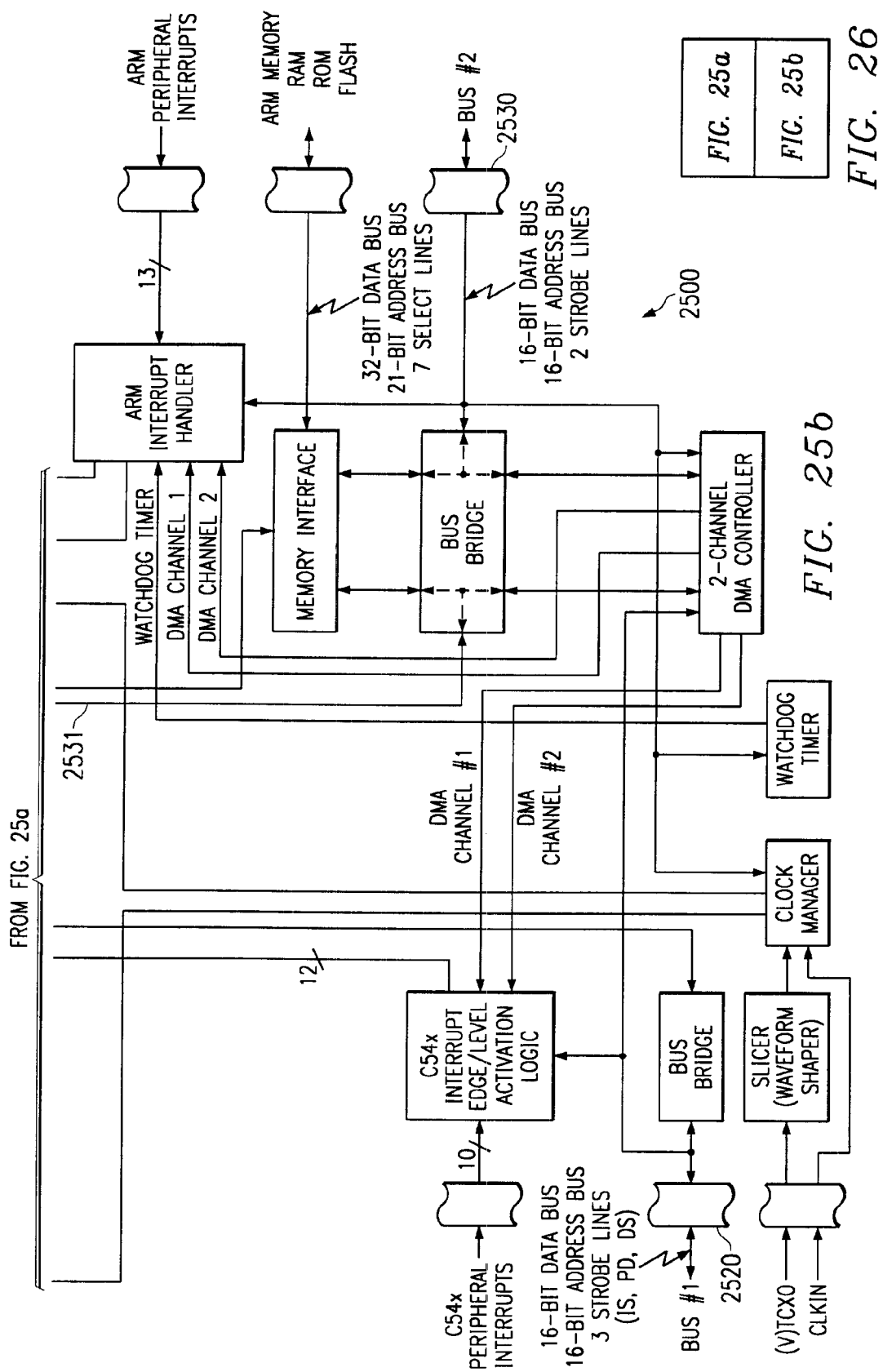
FIG. 26 is a map indicating how

FIG. 25 is a block diagram of a complex digital system 2500 on a single semiconductor substrate having two host processors 2510 and 2512 and two interconnect busses 2520 and 2530, according to aspects of the present invention. Host processor 2512 is included within a megamodule 2513 and host processor 2510 is included within megamodule 2511. Host processor 2510 has access to memory 2540 within megamodule 2513 via bus 2531, such that memory 2540 is a subdomain of interconnect bus 2530.

Megamodules are predesigned cells which can be reused in various ASIC designs. However, an embodiment of the present invention which includes megamodules should not be construed as a limitation of the present inventions. Aspects of the present invention are applicable to the design of digital systems using custom design practices, semicustom designs, and/or ASIC cell libraries, for example.

JTAG port 2560 provides test access to digital system 2500, using an enhanced version of the industry standard JTAG protocol. Emulation port 2561 provides further access and control of the host processors and peripherals in order to test and debug the digital system hardware and to develop software for the digital system.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for transferring a plurality of data on an interconnect bus connected between a first device and a second device, comprising the steps of:

operating the first device in accordance with a first clock signal and the second device in accordance with a second clock signal, wherein the first clock signal operates asynchronously with respect to the second clock signal;

starting a first data transfer between the first device and the second device by the first device asserting a strobe signal on the interconnect bus, the strobe signal having at least a first pulse, wherein the asserted strobe signal operates in a pulsed manner synchronized to the first clock signal until a ready signal is asserted; and completing the first data transfer by the second device asserting the ready signal on the interconnect bus, wherein the second device derives timing information from the pulsed strobe signal such that the ready signal is asserted by the second device in a synchronous relationship to the strobe signal, whereby the first device does not need to synchronize the ready signal.

2. The method according to claim 1, wherein the step of completing the first transfer further comprises asserting a ready signal on the interconnect bus synchronized with the strobe signal, such that a first variable number of wait states is induced in response to a first ready state of the second device, wherein each additional pulse on the strobe signal after the first pulse corresponds to a wait state; and further comprising the step of synchronizing each data transfer on the second device with the second clock in background, such that the first number of wait states is zero.

3. The method according to claim 2, further comprising the step of changing the first ready state to a second ready state during the transfer of a plurality of data, wherein a first number of wait states induced in response to the first ready state is different from a second number of wait state induced in response to the second ready state.

4. The method according to claim 2, wherein the step of changing the first ready state to a second ready state occurs in response to a FIFO type buffer in the second device becoming approximately full or approximately empty.

5. The method of claim 1, further comprising the step of maintaining the strobe signal in a quiescent state when not asserted.

6. The method of claim 5, further comprising the step of distributing the first clock signal within the first device but not to the second device; and distributing the second clock signal within the second device but not within the first device, whereby power dissipation is reduced.

7. The method of claim 1, wherein the first data transfer is of a first type and wherein the step of completing the first data transfer comprises the steps of:

storing first data in a temporary location in the second device in response to the first pulse of the strobe signal;

asserting the ready signal in response to the first pulse of the strobe signal in a synchronous relation with the first pulse of the strobe signal; and transferring the first data from the temporary location to a different location in the second device synchronously with the second clock signal.

8. The method of claim 7, further comprising the step of completing a second data transfer, wherein the data transfer is of a second type and wherein the step of completing the second data transfer comprises the steps of:

synchronizing an internal ready signal within the second device by using pulses on the strobe signal; and asserting the ready signal in response to the synchronized internal ready signal in a synchronous relation with the pulses of the strobe signal, whereby wait states are induced in the second data transfer but not in the first data transfer.

9. A digital system having an interconnect bus for transferring a plurality of data connected between a first device operating in accordance with a first clock signal and a second device operating in accordance with a second clock signal, comprising:

strobe circuitry on the first device connected to the interconnect bus and to the first clock signal, operable to start a first data transfer between the first device and the second device in response to the request signal by asserting a strobe signal on the interconnect bus, the strobe signal having at least a first pulse, wherein the asserted strobe signal operates in a pulsed manner synchronized to the first clock signal until a ready signal is asserted;

ready circuitry on the second device connected to the interconnect bus for completing the first data transfer by asserting the ready signal on the interconnect bus synchronized with the strobe signal;

wait state circuitry in the second device connected to the ready circuitry operating in synchronism with the second clock signal, the state circuitry operable to store a ready state; and wherein the ready circuitry is further operable to assert the ready signal on the interconnect bus synchronized with the strobe signal, such that a first variable number of wait states is induced in response to a first ready state of the second device, wherein each additional pulse on the strobe signal after the first pulse corresponds to a wait state.

10. The data system according to claim 9, further comprising:

synchronization circuitry on the second device connected to the ready circuitry, operable to synchronize each data transfer on the second device with the second clock in background, such that a first number of wait states is zero; and wherein the wait state circuitry is operable to change the first ready state to a second ready state during the transfer of the plurality of data, wherein the first number of wait states induced in response to the first ready state is different from a second number of wait state induced in response to the second ready state.

11. The data system according to claim 10, further comprising:

a FIFO type buffer on the second device connected to the interconnect buss; and wherein the control circuit on the second device is operable to assert the end signal in response to the FIFO type buffer becoming approximately full or approximately empty.

12. The data system according to claim 10, further comprising:

a FIFO type buffer on the second device connected to the interconnect buss;

wherein the control circuitry on the second device is operable to assert the end signal in response to the FIFO type buffer becoming approximately full or approximately empty; and wherein the wait state circuitry is operable to change the first ready state to a second ready state in response to the FIFO type buffer becoming approximately full or approximately empty.

13. A method for transferring a plurality of data on an interconnect bus connected between a first device operating in accordance with a first clock signal and a second device, comprising the steps of:

operating the second device in accordance with a second clock signal, wherein the second clock signal is asynchronous to the first clock signal;

starting a first data transfer between the first device and the second device by the second device receiving a strobe signal from the interconnect bus, the strobe signal having at least a first pulse, wherein the asserted strobe signal operates in a pulsed manner synchronized to the first clock signal until a ready signal is asserted; and completing the first data transfer by the second device asserting the ready signal on the interconnect bus, wherein the second device derives timing information from the pulsed strobe signal such that the ready signal is asserted by the second device in a synchronous relationship to the strobe signal, whereby the first device does not need to synchronize the ready signal.

* * * * *